(12) United States Patent
Elliott

(10) Patent No.: US 7,090,788 B2
(45) Date of Patent: Aug. 15, 2006

(54) NANOPOROUS COMPOSITES OF POLYMERIZED LYOTROPIC LIQUID-CRYSTALLINE MONOMERS, AND HYDROPHOBIC POLYMERS

(75) Inventor: Brian Elliott, Superior, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 323 days.

(21) Appl. No.: 10/422,604

(22) Filed: Apr. 24, 2003

(65) Prior Publication Data

US 2004/0211939 A1   Oct. 28, 2004

(51) Int. Cl.
| | |
|---|---|
| C09K 19/38 | (2006.01) |
| C09K 19/54 | (2006.01) |
| B32B 3/26 | (2006.01) |
| B32B 27/24 | (2006.01) |
| B32B 9/04 | (2006.01) |

(52) U.S. Cl. ............... 252/299.01; 252/299.5; 428/315.5; 428/316.8; 428/323; 428/411.1; 428/500; 428/704; 428/910; 977/897

(58) Field of Classification Search ......... 252/299.01, 252/299.5; 428/1.1, 411.1, 315.5, 500, 704, 428/910, 323, 316.6; 977/897
See application file for complete search history.

(56) References Cited

U.S. PATENT DOCUMENTS

| | | | |
|---|---|---|---|
| 4,614,524 A | 9/1986 | Kraus | 210/638 |
| 5,238,992 A | 8/1993 | Outubuddin | 524/710 |
| 5,670,051 A | 9/1997 | Pinnau et al. | 210/651 |
| 5,849,215 A | 12/1998 | Gin et al. | 252/299.01 |
| 6,054,111 A | 4/2000 | Antonietti et al. | 423/702 |
| 6,264,741 B1 | 7/2001 | Brinker et al. | 117/11 |

OTHER PUBLICATIONS

Pindzola et al., "Cross-Linked Normal Hexgonal and Bicontinuous Cubic Assemblies vua Polymerizable Gemini Amphiphiles", J. of Am. Chem. Soc, 2003, vol. 125, pp. 2940-2949.*
Barton, J. (1996), "Free-radical polymerization in inverse microemulsions," *Prog. Poly. Sci.* 21:399-438.
Capek, I. (1999), "Radical polymerization of polar unsaturated monomers in direct microemulsion systems," *Adv. Colloid Interface Sci.* 80:85-149.

(Continued)

*Primary Examiner*—Shean C Wu
(74) *Attorney, Agent, or Firm*—Greenlee, Winner and Sullivan, P.C.

(57) ABSTRACT

This invention provides composite materials that combine the material properties of hydrophobic polymers with internal structure and order provided by polymerization of lyotropic liquid crystals (LLCs). Composites, particularly nanocomposites, are made by forming a LLC assembly that has hydrophobic regions and hydrophilic regions, combining hydrophobic polymer in the assembly and polymerizing the polymerizable LLC monomers in the assembly. The hydrophobic polymer, polymerized LLC assembly or both can be crosslinked in the composite. Nanoporous composites, particularly those with uniform-sized pores and/or with uniform pores distribution can be prepared in this way. In addition, complex polymers in which a second polymeric material, which may be organic or inorganic, can be introduced into the pores or other structural features of the composite can be prepared. Adding flexible hydrophobic polymers to the LLC assembly increases the flexibility and toughness of the resultant polymerized composite material to provide improved composite materials for use as membranes and in other applications. Hydrophobic polymer addition can also increase the diffusion resistance in the organic phase of the composite. Of particular interest are composites in which the hydrophobic polymer is butyl rubber or related synthetic rubber.

110 Claims, 8 Drawing Sheets

OTHER PUBLICATIONS

Clark, C.G. and K.L. Wooley (1999), "Polymerization of organized polymer assemblies," *Current Opinion in Colloid& Interface Science* 4:122-129.

Collings, P.J. (1990), "Lyotropic Liquid Crystals," In *Nature's Delicated State of Matter*, Princeton University Press: Princeton, NJ., pp. 147-161.

Eastoe, J. and Summers, M. (2000) "Control over Phase Curvature Using Mixtures of Polymerizable Surfactants," Chem. Mater. 12:3533-3537.

Gin, D.L. et al. (2001), "Polymerization lyotropic liquid crystal assemblies for materials applications," *Acc. Chem. Res.* 34:973-980.

Gin, D.L. et al., (1999), "Polymerizable liquid crystals as building blocks for functional, nanostructured materials," *Syn Lett.* 10:1509-1522.

Jung, M. et al., (2001), "Polymerization in Lyotropic liquid-crystalline phases of dioctadecyldimethylammonium bromide," Colloid Polym. Sci. 279:105-113.

Karsa, D.R. (ed.) (1999) "Design and Selection of Performance Surfactants," vol. 2, Sheffield Academic Press, CRC Press. Boca Raton, FL., pp.. 316-338.

Lee, Y.S. et al. (1995), "Polymerization of non-lamellar assemblies," *J. Am. Chem. Soc.* 177:5573-5578.

Liu, J. et al. (2000), "Nanofiltration Membranes Prepared by Direct Microemulsion Copolymerization Using Poly(Ethylene Oxide) Macromonomer as a Polymerizable Surfactant," J. Appl. Polym. Sci. 77:2785-2794.

Mannock, D. (2001), "The physical properties of glycosyl diascylglycerols. Calorimetric, X-ray diffraction and Fourier transform spectoscopic studies of a homologous series of 1,2-di-*O*-acyl-3-*O*-(β-D-galactopyranosyl)-*sn*-glycerols," *Chemistry and Physics of Lipids* 111:139-161.

McGrath, K.M. (1996), "Polymerisation of liquid crystalline phases in binary surfactant/water systems. Part 2. ω-undecenyltrimethylammonium bromide," *Colloid Polym. Sci.* 274:399-409.

Miller, S.A. et al. (1999), "Nanostructured materials based on polymerizable amphiphiles," *Curr. Opin. Colloid Interfaces Sci.* 4:338-347.

O'Brien, D.F. et al. (1998), "Polymerization of Preformed Self-Organized Assemblies," *Acc. Chem. Res. 31*:861-868 (1998).

Paleos, C.M.(1992), "Polymerization of micelle-forming monomers," In *Polymerizations in Organized Media*; Paleos, C.M. Ed.; Gordon and Breach: Philadelphia, pp. 183-214.

Pindzola B, et al. (2001), "Polymerization of a Phosphonium Diene Amphiphile in the Regular Hexagonal Phase with Retention of Microstructure," JACS, 123(19):4617-4618.

Pindzola, B. and Doug Gin (2001) " Polymerization of phosphonium-diene based Gemini surfactants in the regular hexagonal and bi-continuous cubic phases" *Abstracts of Papers of the American Chemical Society*, 22nd National Meeting Aug. 26-30, 2001 Chicago, Il.

Resel, R. et al. (2000), "Structural properties of polymerized lyotropic liquid crystals phases of 3,4,5-tris (ω-acryloxyalkoxy)benzoate salts," *Macromol. Chem. Phys.*, 201:1128-1133.

Ringsdorf, H. et al. (1998), "Molecular architecture and function of polymeric oriented systems. Models for the Study of Organization, Surface Recognition, and Dynamics of Biomembranes," *Angew. Chem., Int. Ed. Engl. 27*:113-158.

Schnur, J.M et al. (1987), "Lipid-based tubule microstructures," *Thin Solid Films* 152:181-206.

Shibasaki, Y. and Fukuda, K. (1992), "Aggregation states and polymerizabilities of amphiphillic monomer molecules in aqueous systems with different water contents," *Colloids Surf.* 67:195-201.

Smith, R.C. et al. (1997), "Ordered poly-(p-phenylenevinlyene) matrix nanocomposites via lyotropic liquid-crystalline monomers," *J. Am. Chem. Soc.* 119:4092-4093.

Srisiri, W. et al., (1997), "Polymerization of the inverted hexagonal phase," *J. Am. Chem. Soc.* 119:4866-4873.

Thundathil, R. et al. (1980), "Polymerization in lyotropic crystals. I. Change of structure during polymerization," *J. Polym. Sci. Polym. Chem. Ed.*. 18:2629-2640.

Tiddy, G.J.T. (1980), "Surfactant-water liquid liquid crystal phases," *Phys. Rep.* 54:1-46.

Wagner-Jauregg, T. et al., (1955), "Model reactions of phosphorus-containing enzyme inactivators. IV.The catalytic of certain metal salts and chelates in the hydrolysis of diisopropyl fluorophosphate," *J. Am. Chem. Soc.* 77:922929.

* cited by examiner

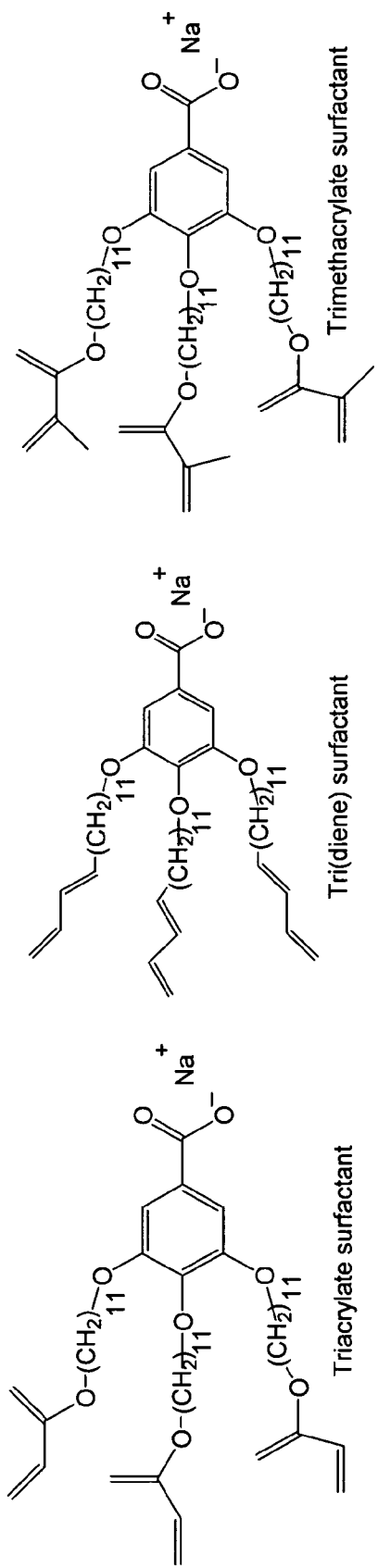
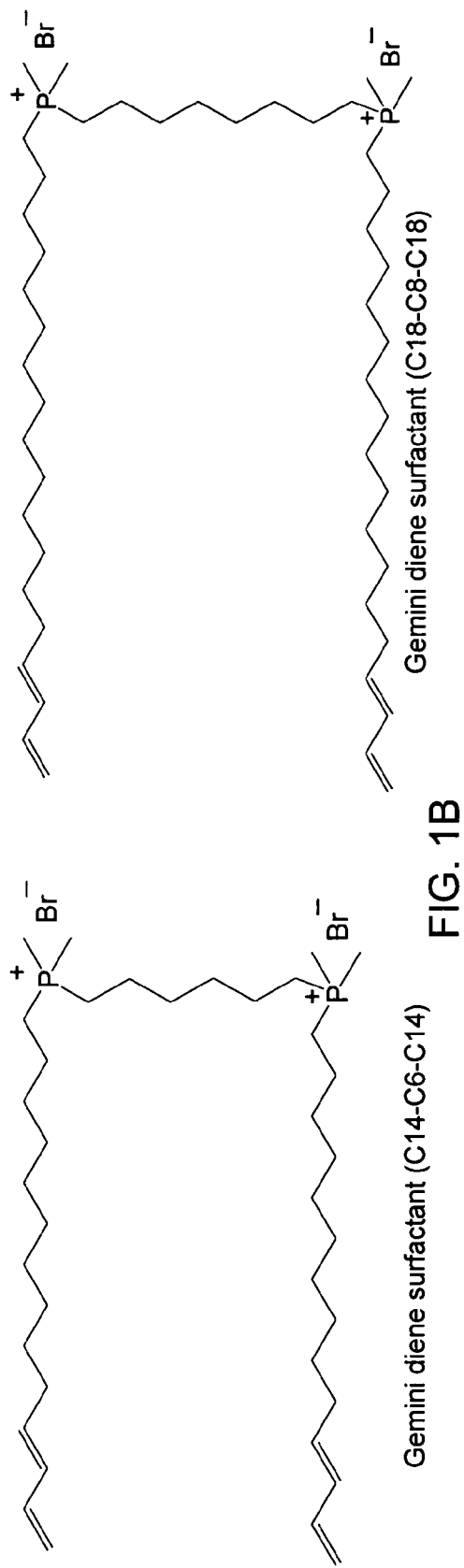
FIG. 1A
FIG. 1B

Inverted hexagonal phase (H$_{II}$)

NANOPOROUS COMPOSITES OF POLYMERIZED LYOTROPIC LIQUID-CRYSTALLINE MONOMERS, AND HYDROPHOBIC POLYMERS

STATEMENT REGARDING FEDERALLY SPONSORED RESEARCH

This invention was made, at least in part, with funding from the Army Research Office Contract No. ARMY STTR DAAD19-02-C-0018. Accordingly, the U.S. government may have certain rights in the invention.

BACKGROUND OF THE INVENTION

This invention relates to a composite materials formed from polymerizable surfactants and hydrophobic polymers. The invention relates in particular to nanoporous composites.

Liquid crystals (LC) are a class of molecules that posses some form of anisotropy. This anisotropy can be achieved in two ways: either the LC molecules have one molecular axis that is very different from the other axes of the molecule, or the LC molecules possess portions with very different solubilities. Lyotropic liquid crystals have portions with very different solubilities (i.e. surfactants). Lyotropic liquid crystals (LLC) are a subset of liquid crystals which are materials that exhibit properties between those of liquids and crystals. There are various kinds of liquid crystals with varying degrees of order. Some LCs exhibit only orientational order, other LCs exhibit both orientational order and positional order in one or two dimensions. The composite materials of the present invention contain lyotropic liquid crystals in which portions of the LLC have very different solubilities. Typically, but not always, a solvent is required to induce the liquid crystal order.

More specifically, LLC mesogens are amphiphillic molecules containing one or more hydrophobic organic tails and a hydrophilic headgroup (Collins, P. J, 1990). The amphiphillic character of these molecules encourages them to self-organize into aggregate structures, often in the presence of polar solvents, such as water, with the tails forming hydrophobic regions and the hydrophilic headgroups defining the interface of phase-separated polar or aqueous solvent domains. These LLC assemblies can be relatively simple individual structures, such as micelles and vesicles (as illustrated in FIG. 1 of Gin et al., 2001, top row) which are termed LLC aggregates herein or highly ordered, yet fluid, condensed LLC assemblies with specific nanometer-scale geometries, known collectively as LLC phases (as illustrated in FIG. 1 of Gin et al., 2001, bottom row) (Collins, 1990; Tiddy, 1980.) LLC assemblies can include both LLC phases and LLC aggregates.

Biological materials, such as bone and shell, exhibit unusual properties that have been associated with nanometer-scale structural features present in these materials. Considerable effort has been expended in attempts to develop method that allow the introduction of nanoscale structures into synthetic composite materials with a view to producing new materials with unusual properties. It has not been possible, in general, to employ conventional materials processing to readily achieve nanometer-scale structural control in the production of synthetic materials. Thus, the development of methods for constructing synthetic composites with nanometer scale organization has become the focus of significant levels of research in materials science. Covalent stabilization, e.g., through polymerization, of two and three-dimensional structures of self-assembled molecules has been applied to form materials with desired nanoscale structure (Clark et al., 1999.) U.S. Pat. No. 6,264,741, for example, relates to a method of making nanocomposites using polymerization of self-assembled components.

LLC assemblies can provide the geometry control needed for production of nanostructured materials (Gin et al. *Syn Lett.* 1999; and Miller et al., 1999.) The architectures of LLC aggregates and phases can incorporate hydrophobic and hydrophilic compounds in separate domains with well-defined nano-scale geometries. The amphiphillic self-assembly process localizes the headgroups of the LLC mesogens exclusively at the hydrophobic/hydrophilic interface (headgroups toward the hydrophilic phase).

The organization of LLC assemblies (both phases and aggregates) are primarily dependant on the concentrations of the LLC surfactant and polar or aqueous solvent, however, like thermotropic liquid crystals, the ordered structures are also a function of temperature. Heating a material having a LLC phase or aggregate above the clearing point of the LLC will form a homogeneous, isotropic melt. Cooling the isotropic LLC material below the clearing point will cause the LLC phase to reform. When an external force is exerted on an LLC phase, the material will flow and the shear can affect the phase orientation and crystal domain size. Adding (or removing) solvent can cause the phase to change, and adding enough solvent to dilute the surfactant to below the critical micellar concentration results in an isotropic solution.

LLC assemblies can be employed as templates for materials preparation. U.S. Pat. No. 6,054,111, for example, reports the use of LLC phases of amphiphillic block copolymers as templates for the preparation of mesoporous inorganic solids or metals by polymerization or other chemical reactions of precursors combined with the LLC copolymers (mesoporous is defined therein as having a pore diameter ranging from 2 to 60 nm). Preparation of the mesoporous solid is completed by removal of the LLC phase template.

While LLC assemblies can provide nanoscale structure, the assemblies are inherently fluid and often lack the robustness required for most materials applications. Jung et al., 2001 reports on the polymerization of monomers inserted into the hydrophobic portion of LLC phases of dioctadecyldimethylammonium bromide. In general discussion of the use of LLC (and other LC) phases as templates for materials preparation, the authors state that "complex phase changes" during polymerization "can frustrate the concept of direct 'templating'." The reference reports the results of styrene polymerization in cubic LLC phases. After polymerization the phase structure is maintained only if the system is kept at constant temperature. The authors report that as a result of phase separation the polymerization does not provide a stable copy of the LCC template phase.

The use of polymerizable or crosslinkable LLC mesogens allow LLC assemblies to be more generally employed as templates for materials having nanoscale structures.

Polymerizable or crosslinkable LLC mesogens are reactive amphiphiles which aggregate into the same type of LLC assemblies as their non-polymerizable analogues, but which can be covalently linked to their nearest neighbors in situ to form robust polymer networks that retain the original LLC structure even when the temperature is raised past the clearing point of the unpolymerized system or when excess solvents are added (Gin, D. L et al. *Acc. Chem. Res.*, 2001; U.S. Pat. No. 5,849,215).

Micelles (Paleos, 1992), inverse micelles (Barton, 1996) and microemulsions (Capek, 1999) can be polymerized with retention of phase microstructure. U.S. Pat. No. 5,238,992 reports the preparation of polymer blends of controlled porosity by polymerization of monomers in microemulsions. Lamellar assemblies such as vesicles (Ringsdorf et al., 1998), lipid microtubules (Schnur et al., 1987) and the lamellar (L) phase (Ringsdorf et al., 1998) have also been successfully polymerized. The polymerization of more geometrically complex, non-lamellar LLC phases has also been achieved. Several complex phases including the normal hexagonal phase ($H_I$), and the inverted hexagonal phase ($H_{II}$) (Gin et al., *Acc. Chem. Res.* 2001; Thundathil et al, 1980; Shibasaki et al., 1992; McGrath, 1996; Smith, et al.1997; and Srisiri et al., 1997) have been polymerized with retention of phase structure. Polymerization of the most geometrically complex, bicontinuous cubic ($Q_{II}$, $Pn_3m$) phase was reported by Lee, Y. S. et al., 1995.) Resel et al. 2000 report a structural study of polymerized LLC phases of certain LLC salts. It is reported that the structural properties of polymerized films can be affected by the length of the hydrophobic tail of the LLC and the nature of the metal counterion used.

Polymerizable surfactants are molecules having at least a pair of hydrophobic and hydrophilic components and at least one polymerizable group, such as a vinyl group, in their structure (Karas(ed.), 1999.) Polymerizable surfactants have been employed in several technologies including polymer emulsions, particulate encapsulation, etc. As noted above, polymerizable surfactants can be used to form LLC phases in the production of useful materials with highly regular nano-scale architectural features (i.e. pores, etc.). Polymerizable groups such as acrylate, methacrylate or diene groups have often been employed because groups can be easily photopolymerized. Photopolymerization is the preferred polymerization scheme because it can be initiated "on command" by irradiation of light over a wide temperature range. Using photopolymerization methods, the sample can be heated or cooled (if necessary) to a temperature where the desired LLC phase exists and then photopolymerized by exposure to ultraviolet (uv) light. Generally, a small amount of an initiator molecule is used in the photopolymerization to absorb uv light and generate free radicals which polymerize the surfactants. Non-photopolymerization reactions using, for example, thermal initiators and/or other spontaneously decaying initiators can also be used to polymerize LLC assemblies. For thermal initiated systems, the initiator molecule must have a suitable half-life decay at a temperature that is below the clearing point for the LLC phase or aggregate.

Srisiri et al.,1997 report a method to produce phospholipid dienoyl molecules as polymerizable surfactants. Srisiri et al. report that the reactive diene group could be located on either or both lipid tails near the lipid backbone, i.e. the glycerol unit in the case of phospholipids.

Pindzola, et al., 2001 report that surfactants with a terminal diene can be polymerized and maintain their liquid crystal structure. Optionally, a divinylbenzene could be used to crosslink the diene monomers.

O'Brien et al., 1998 is a review article on polymerization of preformed self-organized assemblies. Examples of polymerizable lipids are provided. Polymerization of nonlamellar phases including the $H_{II}$ hexagonal phase and several bicontinuous cubic phases the structures of which are illustrated. The authors note that polymerization of bicontinuous cubic phases (bicontinuous means that the phase contains continuous polar (hydrophilic) and nonpolar (hydrophobic) regions) should yield materials with interpenetrating water channels (polar regions). FIG. 7 of the reference illustrates exemplary structures of such channel networks.

U.S. Pat. No. 5,849,215 (Gin et al.) and Gin et al., *Acc. Chem. Res.*, 2001 report a method for synthesizing composites with architectural control on the nanometer scale. The patent reports an ordered nanocomposite of a matrix component and a filler component. The matrix component comprises polymerized inverse hexagonal phase-forming lyotropic liquid-crystalline (LLC) monomers and defines a hexagonally-packed array of tubular channels. The filler component, which is contained in the tubular channels of the material, is a solid or semi-solid component which provides structural integrity or adds other beneficial properties. Filer components are hydrophilic and compatible with the aqueous phase in the tubular channels. The polymerizable surfactant monomer system is used as an organic template, providing the underlying matrix and order of the composite system. Polymerization of the template in the presence of an optional crosslinking agent with retention of the liquid-crystalline order was followed by a second polymerization of a hydrophilic polymer precursor within the tubular channels of the polymer template.

The present invention relates to adding hydrophobic polymer to the organic (hydrophobic) domains of the LLC phase for the purpose of imparting physical of chemical properties to the nanocomposite such as forming an elastomeric material or an organic matrix or high chemical resistance. Subsequently, the surfactant molecules react with themselves to form covalent bonds.

While nanocomposites have been prepared employing polymerizable LLCs there remains a need in the art for composite materials with varying properties.

SUMMARY OF THE INVENTION

The invention provides composite materials having an organic matrix comprising a polymerized lyotropic liquid crystal and one or more hydrophobic polymers. The polymerized LLC in the composite retains at least in part the structure of an LLC assembly forming a polymerized LLC assembly. The hydrophobic polymer does not itself form an LLC phase or LLC aggregate. Within the organic matrix of the composite, the polymerized LLC, the hydrophobic polymer or both may be crosslinked. The LLC assembly of the composite comprises at least one polymerizable LLC monomer. The LLC assembly may be formed from a mixture of two or more LLC molecules which include at least one polymerizable LLC monomer and optionally include an LLC molecule that does not contain a polymerizable group. The composite has hydrophobic regions formed from the hydrophobic tails of the LLC molecules and hydrophilic regions formed from the hydrophilic head groups of the LLC molecules. The one or more hydrophobic polymers added are segregated into hydrophobic regions of the composite Preferred composite materials comprise pores which may or may not form continuous pores in the material. More preferred composite materials comprise nanopores having pore diameters in the range of about 0.3 nm to about 50 nm. More preferred nanoporous composite materials have pore diameters in the range less than about 5 nm, and more specifically, in the range of about 0.3 nm up to about 5 nm. More preferred, nanoporous composite materials have pore diameters in the range of less than about 2 nm, and more specifically, in the range of about 0.3 nm up to about 2 nm.

The hydrophobic polymer of the composites herein is selected so that it does not remain in hydrophilic regions of the LLC assemblies. Preferred hydrophobic polymers are water insoluble. The hydrophilic polymer can, for example, be selected from the group of polymers and copolymers comprising monomers selected from isobutylene, isoprene, propylene oxide, propylene, ethylene, acrylates, methacrylates, lactic acid, ethylene terphthalate, styrene, aramides, urethanes, halogenated derivatives of these monomers (e.g., vinyl chloride, chloroethylene). The hydrophobic polymer can also be selected from the copolymers polyesterurethanes and polyetherurethanes or copolymers of the listed monomers with unsaturated nitriles (e.g., acrylonitrile) or saturated or unsaturated glycols. The hydrophobic polymer can be selected from poly(isobutylene), poly(isoprene), poly (propylene oxide), poly(propylene), poly(ethylene), chlorinated poly(ethylene), poly(acrylates), poly(methacrylates), poly(lactic acid), poly(ethylene terphthalate), poly (styrene), poly(vinyl chloride), poly(aramides), poly(urethanes), polyesterurethanes, polyetherurethanes and halogenated derivatives thereof.

Preferred hydrophobic polymers are those having molecular weight of about 500 Dalton or more or those having 10 or more monomer repeat units. More preferred hydrophobic polymers are high molecular weight polymers with molecule weight of 1000 D or more, or those having 20 or more monomer units. Hydrophobic polymers may be homopolymers or copolymers (e.g., random copolymers or block copolymers), particularly copolymers of two or three monomers In a specific embodiment, the hydrophobic polymer is an elastomer, which may be a thermoset or a thermoplastic elastomer. Elastomers include synthetic rubbers such as a butyl rubber, a halobutyl rubber, a butadiene rubber, a neoprene rubber, a styrene-butadiene rubber or elastomeric mixtures thereof. In a preferred embodiment, the hydrophobic polymer is a polymer which is gas-impermeable or exhibits low gas permeability, preferred polymers exhibiting gas-impermeability or low gas permeability are butyl rubbers or halogenated butyl rubbers.

In the composites of this invention the hydrophobic polymer and the LLC surfactant tails (hydrophobic tails) co-occupy hydrophobic domains in the composite. In the composites of this invention, the hydrophobic polymer may be incorporated into an LLC phase providing a swollen LLC phase and/or into LLC aggregates associated with the hydrophobic surfactant tails of the LLC, the hydrophobic polymer may form subregions of hydrophobic polymer within or surrounding LLC phases and/or LLC aggregates, or the hydrophobic polymer may in part enter into the hydrophobic LLC phase and in addition form subregions of polymer within or surrounding LLC phases and/or LLC aggregates. Within the composite, the organic matrix formed comprises polymerized LLC tails, hydrophobic polymer and optionally crosslinked products thereof.

The composites of this invention may contain pores as noted above or the composites may contain regions or domains that are hydrophilic. Of particular interest are composites containing pores, regions or domains that are nano-sized. Pores or hydrophilic regions of the composites herein may contain water, aqueous solutions, polar solvents or combinations thereof. Porous composite materials of this invention include those in which the surfaces of the pores have been derivatized or otherwise chemically treated or coated to provide desirable chemical properties or surface properties.

The invention further provides complex composites which contain a second polymeric material within pores or other structures formed in the organic matrix of the composite containing the polymerized LLC tails and the hydrophobic polymer. Of interest are complex composites in which the second polymeric material is discretely dispersed in nano-sized structures, such as pores, in the organic matrix formed by the polymerized LLC tails and the hydrophobic polymer. Of particular interest are complex composites in which the second polymeric material is discretely dispersed uniformly in the organic matrix and/or in which the second polymer is discretely dispersed in uniformly-sized structures (e.g., pores) in that matrix. The complex composites of this invention can be formed by in situ polymerization of one or more suitable monomers in the pores or other structures in the composite. The second polymeric material can be formed, for example, by in situ polymerization of one or more hydrophilic or water-soluble monomers. The second polymeric material is typically different from the hydrophobic polymer or its crosslinked product. The second polymeric material can be an organic polymer or an inorganic polymer or a mixture thereof.

In the composites and complex composites of this invention, the polymerized LLC, the hydrophobic polymer or both may be crosslinked. In the complex composites of this invention the second polymer may be crosslinked.

The composites and complex composites of this invention optionally contain additional non-polymeric additives that affect the properties of the resultant composite materials such as vulcanizing agents to later crosslink the hydrophobic polymer, plasticizing agents for the polymer(s), anti-oxidants, chemical scavengers, and colorants. In general, any additives known in the art that provide a benefit to a polymer for a selected application. In particular, for membrane applications additives include any additives known in the art to provide benefit to polymer materials used in membrane applications.

In a most preferred embodiment the hydrophobic polymer is butyl rubber, another synthetic rubber or a mixture of two or more synthetic rubbers. Optionally, the hydrophobic polymer is crosslinked by vulcanization (particularly synthetic rubbers) or other chemical reactions known to those skilled in the art. Vulcanization is typically performed by heating the polymeric material typical in the presence of chemical additives including sulfur, organic peroxides, sulfur donor compounds, thiurams, thiazoles, dithiocarbamates, quinines, or resins.

The composites and complex composites of this invention can be formed into a variety of bulk structures including films and membranes. Composites and complex composites of this invention can be employed in a variety of separation, purification, and catalytic applications. In a preferred embodiment the membrane prevents the penetration of chemical warfare agents or other harmful chemicals, while allowing the penetration of water vapor and as such can be used for protection, e.g., in masks, gloves, clothing and in other protective materials, from such agents.

In a specific embodiment, the invention provides porous membrane, particularly nanoporous membranes, which are optionally chemically selective, which are formed from or which comprise nanoporous composite materials of this invention.

In other specific embodiments, the composite and complex composite materials of this invention include polymers including elastomers, and more specifically synthetic rubbers with highly uniform pores with diameters ranging from less than 1 nm up to about 50 nm. The synthetic rubber composites herein can be employed as breathable rubber. In general the composites of this invention can be used in membrane separations and in other applications that require nanometer scale porosity.

In another aspect, the present invention provides methods for the formation of ordered composites, particularly ordered nanocomposites, of polymerized lyotropic liquid-crystalline monomers, and hydrophobic polymers, particularly those having a continuous organic phase and nanopores.

The method comprises the steps of:

(a) combining a polymerizable LLC surfactant monomer with a hydrophobic polymer and optionally an aqueous or polar solvent, the LLC surfactant monomer is present in an amount relative to the hydrophobic polymer and the aqueous or polar solvent is present in an amount such that at least a portion of the LLC surfactant monomer forms an LLC phase and/or LLC aggregates; and (b) polymerizing polymerizable LLC monomers in the composition formed in step (a) to form a polymerized LLC phase and/or polymerized LLC aggregates to form the desired composite.

The composition formed in step (a) may be achieved in various ways. In one embodiment, a polymerizable LLC monomer may be added to an aqueous or polar organic solvent in relative amounts of monomer and solvent to form a desired LLC phase or desired LLC aggregates. The temperature of this combination may be adjusted to obtain the desired phase and/or aggregates. Thereafter a selected amount of hydrophobic polymer (which may be dissolved in a selected solvent) is added to the combination containing nonpolymerized LLC phase or aggregates. In another embodiment, the combination of step (a) may be formed by combining a selected amount of the polymerizable LLC monomer with a selected amount of hydrophobic polymer with optional addition of an aqueous or polar solvent where the temperature and/or the amount of solvent present is adjusted such that LLC phases and/or LLC aggregates are formed. In particular embodiments, the LLC monomer is selected and the temperature and type and amount of aqueous and/or polar solvent is selected to form an LLC phase having the inverted hexagonal or the bi-continuous cubic structure.

The composition formed in step (a) may contain LLC monomers that are not within LLC phases and/or LLC aggregates. However, it is preferred that substantially all of LLC monomers in the combination of step a are within LLC phases and/or LLC aggregates The hydrophobic polymer of the composition of step (a) is optionally crosslinked. Crosslinking may be performed at the same time as or after polymerization of the LLC monomers in the combination. It is preferred that polymerization of the LLC is performed before crosslinking of the hydrophobic polymer. For example, the polymerized composite containing the hydrophobic polymer may be treated by heat accelerated vulcanization. The polymerized LLC in the polymerized composite may also be crosslinked if desired.

Polymerization of the polymerizable LLC monomer tails is performed by a chemical reaction, such as a free radical polymerization reaction. The polymerization may be initiated by irradiation with light of appropriate wavelength (i.e., photoinitiated), by introduction of a chemical reagent or catalyst and/or by thermal initiation. The composition of step (a) may further contain chemical reagents for initiation of polymerization and/or chain elongation agents and/or crosslinking reagents for the polymerization and/or crosslinking of the LLC monomer tails. The composition of step (a) may also contain additional non-polymeric additives that affect the properties of the resultant composite materials such as vulcanizing agents to later crosslink the hydrophobic polymer, plasticizing agents for the polymer, antioxidants, chemical scavengers, and colorants. In general, any additives known in the art to provide a benefit to a polymer for a selected application. In particular, for membrane applications additives include any additives known in the art to provide benefit to polymer materials used in membrane applications.

Any pores of the composite material may be treated to affect the pore surfaces. For example, the pores may be derivatized or coated with organic or inorganic species to provide a desirable surface property, particularly a property that is beneficial in the use of membranes for selective separations. The pores can be selectively derivatized or coated with anions, cations, ligands for metal binding, non-linear optical compounds, catalytic molecules including polyoxometalates, organometallic compounds, protons, hydroxides or other polar or protic groups, fluorescent compounds, enzymes and proteins.

In another embodiment, the present invention provides a method for making a composite material in which the liquid crystal (LC) monomer and hydrophobic polymer are combined and thereafter annealed by temperature induced phase separation. In this method, the hydrophobic polymer is dissolved in a suitable organic solvent and added to the LC monomer in water (or polar solvent) mixture. The mixture is heated to above the clearing point (melting point) of the LC monomer. The isotropic melt/solvent mixture is then mixed to achieve molecular mixing of the hydrophobic polymer and LC monomer. In a preferred embodiment, the mixture is a solution. After mixing, the temperature of the mixture is lowered to below the clearing point of the LLC monomer, the solvent is removed and the LLC phase is formed in situ. In a preferred embodiment, solvent is removed after the temperature of the mixture is lowered to below the clearing point of the LLC monomer and the LLC phase is formed.

The invention further provides a method for making a complex composite material which comprises the steps of:

(a') introducing one or more suitable monomers into the pores or other structures formed within the organic matrix of a composite formed by polymerization of an LLC assembly containing a hydrophobic polymer; and (b') polymerizing the monomers in the structures within the organic matrix of the composite to form a second polymer material to form the complex composite material.

The polymerized LLC, the hydrophobic polymer or both in the complex composite may be subjected to crosslinking reactions. The second polymer in the complex composite may be subjected to crosslinking. In a specific embodiment, the pores or other structures are hydrophilic regions formed within the organic matrix of the composite.

In a specific embodiment, the step of introducing monomers into the structures within the organic matrix of a composite can be performed after the polymerization of the LLC assembly formed by LLC monomers or after optional crosslinking of the polymerized LLC, the hydrophobic polymer or both. In an alternative specific embodiment, the step of introducing suitable monomers into the pores of other structures formed within the organic matrix of a composite can be performed before polymerization of the LLC assembly. In this case, one or more hydrophilic monomers are introduced into the hydrophilic regions of the LLC assembly and the hydrophobic polymer is introduced into the hydrophobic regions of the LLC assembly. Appropriate relative amounts of polymerizable LLC monomers, hydrophobic polymer, one or more hydrophilic monomers and optionally water or another polar solvent are combined to form an LLC assembly having hydrophobic and hydrophilic regions in which the hydrophobic polymer is in hydrophobic regions and the hydrophilic monomers are in the hydrophilic regions of the LLC assembly. Thereafter, the LLC monomer is polymerized and the hydrophilic monomers are polymerized to form the second polymer material thereby generating a complex composite material. The polymerized LLC, the hydrophobic polymer and the second polymer are optionally crosslinked.

The invention further provides composite precursor compositions comprising a polymerizable LLC monomer and a hydrophobic polymer and optionally containing water and/ or a polar solvent in which the LLC monomer, hydrophobic polymer and the water and/or solvent are present in relative amounts such that the LLC monomers can form an LLC assembly. The LLC assembly need not be present in such precursor compositions, but the precursor composition can be treated by heating and/or cooling, by mixing or by applying shear force to form a useful LLC assembly. Precursor composition may be treated to change the LLC structure present therein, for example, by added or removing water or other solvent or by changing the temperature of the composition. The invention also provides LLC assemblies comprising a polymerizable LLC monomer, a hydrophobic polymer, and optionally water and/or a polar solvent in which at least a portion of the LLC monomers form an LLC assembly. LLC assemblies can be treated by redissolution or by heating/cooling to disrupt LLC assembly structures and form a more desirable LLC assembly. The precursor compositions and LLC assemblies are useful for making composite and complex composite materials of this invention.

BRIEF DESCRIPTION OF THE DRAWINGS

FIGS. 1A–D illustrate structures of polymerizable lyotropic liquid crystals that form inverted hexagonal and bi-continuous cubic phase.

DETAILED DESCRIPTION OF THE INVENTION

Figure 1C:
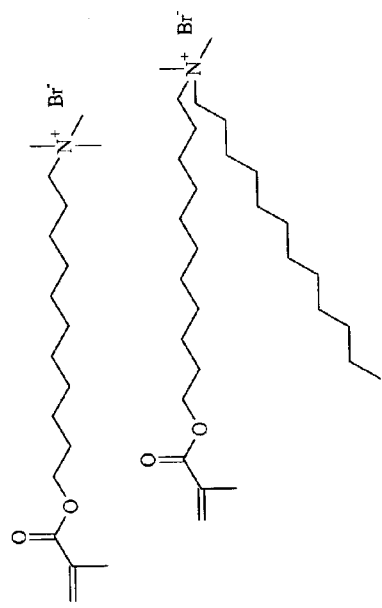
Figure 1D:
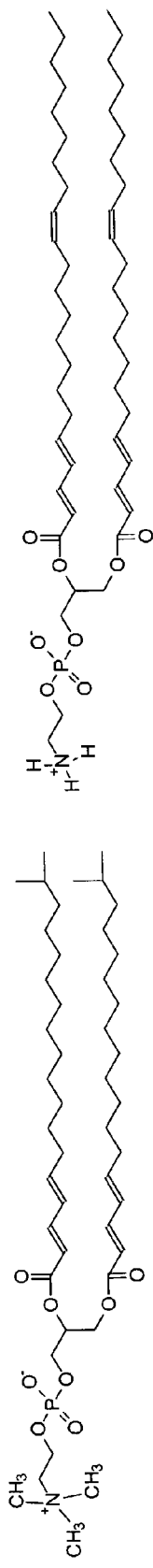

The present invention relates to composite materials containing polymeric liquid crystalline materials and hydrophobic polymers, which form ordered structures with nanometer sized features, such as pores.

Lyotropic liquid crystals are molecules that form liquid crystalline phases in the presence of an aqueous solvent or a polar solvent (typically water). LLC mesogens are amphiphillic molecules which have portions with very different solubility and the anisotropy in the solubility of portions of the molecules leads to self assembly of these molecules into liquid crystal assemblies. LLCs typically have one or more hydrophobic tails (typically organic) and a polar or hydrophilic head group. Examples of LLC monomers are illustrated in FIGS. 1A–D.

Many different lyotropic liquid crystal phases or aggregates can be formed, and the actual phase that forms depends on the concentration of the solvent, liquid crystal and other organics (if present). A lyotropic liquid crystal phase is a highly ordered, yet fluid, condensed assembly of LLC molecules with a specific nanometer-scale geometry. Phases have some degree of long-range order and examples of LLC phases include lamellar phase and non-lamellar phases (e.g., hexagonal, inverted hexagonal and bi-continuous cubic phases.) LLC aggregates are a grouping of LLC molecules to form an ordered structure with nanometer-scale size features. Aggregate do not necessarily have any long-range order. Examples of LLC aggregates include, micelles, reverse micelles, vesicles and lipid microtubules. The term LLC assemblies as used herein includes LLC phases and/or LLC aggregates. Structures of LLC phases and aggregates are illustrated in FIG. 1 of Gin et al., *Accts. Chem. Res.*, 2001. This reference also discusses and provides examples of the relationship between LLC molecule structure and the structure of LLC assemblies formed on self-assembly of LLC molecules.

Polymers with lyotropic liquid crystalline order are produced by allowing polymerizable LLC monomers (which are a subset of polymerizable surfactants) to self-assemble and then polymerizing or crosslinking the hydrophobic tails of the LLC monomers together by a polymerization reaction, which locks in the structure. Polymerizable LLC monomers are monomers having properties of LLCs which contain one or more polymerizable functional groups. LLC assemblies useful in the methods and materials herein include those in which only a portion of the LLC molecules are polymerizable. Preferably at least about 50 molar % of the LLC molecules in the LLC assemblies are polymerizable. Most preferably all of the LLC's of the LLC assembles are polymerizable. LLC assemblies useful in this invention can contain a mixture of different LLC molecules (including different polymerizable LLC molecules.) Mixtures of different LLC molecules can be combined to form an LLC assembly of selected structure (See FIG. 1C).

The term composite is used herein to refer to a material comprising at least two different polymerized species. The different polymeric materials in the composite may co-occupy regions of the composite or they may be present in separate discrete regions within the composite. Composites of this invention have internal order or structure, such as pores, formed as a result of the ordering or assembly of LLC monomers in the composite. Specific composites herein comprise a continuous organic or hydrophobic matrix containing hydrophilic subregions, which can provide pores in the composite. Composites may comprise a continuous hydrophobic matrix and a continuous hydrophilic network throughout the matrix, e.g., a continuous network of pores.

Polymeric composites of this invention with lyotropic liquid crystalline order are made by combining polymerizable surfactants and hydrophobic polymers, such as butyl rubber (including polyisobutylene-co-isoprene, where isoprene is 1 to 3%), into self-assembled structures. The liquid crystal structure is permanently locked into the polymer/ LLC composite by a polymerization reaction that covalently bonds the surfactant tails together. Optionally, the hydrophobic polymer may be crosslinked by chemical reaction (the polymer can be bonded only to itself or also bonded to the polymerizable LLC monomer).

The motivation for using liquid crystals in the methods herein is that they are self-organizing. Self-organized nanometer-scale architecture is found in many biological materials. Unfortunately, very few techniques for constructing man-made materials offer compositional or architectural control on this size regime. Of particular interest for forming a polymer composite material with nanometer-sized pores are the bi-continuous cubic and inverted hexagonal phases. Both of these phases can form porous pathways for liquid and vapor transport that are continuous from one side of the material to another side (such as a membrane). In specific embodiments, pores are formed by the arrangement of polar head groups of the LLC monomers in an LLC phase. In these LLC phases, pore size is the diameter of the space formed by the head groups, which is typically very uniform in size (when the LLC monomers are the same.) In these LLC phases the pores are essentially "mono-dispersed", i.e., pore size is uniform throughout the LLC phase. The pore size can be changed by changing the surfactant size, shape or specific chemical nature. The pore size can be measured by microscopy, e.g., transmission electron microscopy (TEM) or atomic force microscopy (AFM). Pore size can be assessed by determining what size of molecules (or other materials) can pass through porous membranes formed from the LLC composites of this invention using molecular size cut-off experiments.

Adding hydrophobic polymers to the hydrophobic domains of LLC assemblies has several advantages. Crosslinked or polymerized LLC phases are typically very brittle. Addition of polymeric materials to the LLC phase provides polymer composites with improved mechanical properties. In particular, addition of elastomers to the LLC phases provides polymer composites with increased flexibility and toughness. This invention demonstrates that hydrophobic polymer addition to an LLC mixture does not disrupt self-assembly of the LLC into LLC assemblies, and does not detrimentally affect stabilization of the LLC assembly by polymerization. Further, the results herein demonstrate that inclusion of polymers in the hydrophobic phase of such LLC structured composites can confer beneficial properties on the resultant composite.

More specifically for applications to the preparation of porous membranes, brittle polymerized LLC phases do not form useful membranes unless they are properly supported. Addition of elastomeric polymers to the LLC structure increases the flexibility and toughness of porous polymer composites and therefore increase the usefulness of these materials as membranes or in other applications. Further, the addition of hydrophobic polymers (such as butyl rubber) to the hydrophobic regions of an LLC assembly can increase the diffusion resistance in the organic phase of resultant composite formed from the polymerized LLC assemblies. Yet further, the addition of chemically resistant polymers, like butyl rubber, can increase the chemical resistance of the polymer/LLC composite.

In general, any hydrophobic polymer or mixture of hydrophobic polymers can be combined into the LLC assemblies in the methods herein. The term hydrophobic polymer is used herein to exclude polymers that would enter into or associate within hydrophilic regions or subregions in the LLC assembly or the composite that results from polymerization of that assembly. Hydrophobic polymers include those that are not water-soluble. Hydrophobic polymers also include polymers that are water-soluble to some degree as long as the polymer on mixing with the LLC monomers associates with the hydrophobic regions of the LLC assembly formed. In contrast the term hydrophilic as applied to polymers or to polymer precursors (which may be monomers or lower molecular weight polymers) is used to refer to polymers and monomers that would enter into or associate with hydrophilic regions or subregions in the LLC assembly or the composite that results from polymerization of that assembly. Hydrophilic polymers and hydrophilic monomers include those that are water-soluble.

Hydrophobic polymers employed in the methods and composite materials herein are intended to remain in the hydrophobic regions of LLC assemblies formed and are not intended to be solubilized, assemble or aggregate in the hydrophilic regions of the LLC assemblies. Water-insoluble hydrophobic polymers may be insoluble in water because of their chemical structure or because of their high molecular weight. Preferred hydrophobic polymers are those having molecular weight of about 500 Dalton or more or those having 10 or more monomer repeat units. More preferred hydrophobic polymers are high molecular weight polymers with molecule weight of 1000 D or more, or those having 20 or more monomer units.

Hydrophobic polymers may be homopolymers or copolymers (e.g., random copolymers or block copolymers, particularly copolymers containing two or three different monomers.)

Hydrophobic polymers useful in the methods and composites of this invention include homopolymers, random copolymers and block copolymers which contain monomers selected from the group of polymers and coplymers comprising monomers selected from isobutylene, isoprene, glycols, diols, propylene oxide, propylene, ethylene, acrylates, methacrylates, lactic acid, ethylene terphthalate, styrene, aramides, urethanes, and halogenated derivatives of these monomers (e.g., vinyl chloride, chlorodethylene). Useful hydrophobic polymers include copolymers containing two different monomers, particularly elastomers containing two different monomers (e.g., styrene-butadiene polymers.) Useful hydrophobic polymers include copolymers containing three different monomers, particularly those which are elastomers. The hydrophobic polymer can also be selected from the copolymers polyesterurethanes and polyetherurethanes or copolymers of the above listed monomers with unsaturated nitriles (e.g., acrylonitrile) or saturated or unsaturated glycols or diols.

More specifically, hydrophobic polymers useful in the methods and materials of this invention can be selected from poly(isobutylene), poly(isoprene), poly(propylene oxide) poly(propylene), poly(ethylene), chlorinated poly(ethylene), poly(acrylates), poly(methacrylates), poly(lactic acid), poly (ethylene terphthalate), poly (styrene), poly(vinyl chloride), poly(aramides), poly(urethanes), polyesterurethanes, polyetherurethanes and halogenated derivatives thereof.

Of particular interest is the addition of elastomers to the LLC assemblies in the methods herein to increase the flexibility and toughness of the composites formed. In a specific embodiment, the hydrophobic polymer is an elastomer, which may be a thermoset or a thermoplastic elastomer. Elastomers include synthetic rubbers such as a butyl rubber, a halobutyl rubber, a butadiene rubber, a neoprene rubber, or a styrene-butadiene rubber. In a preferred embodiment, the hydrophobic polymer is a polymer which is gas-impermeable or exhibits low gas permeability, preferred polymers exhibiting gas-impermeability or low gas permeability are butyl rubbers or halogenated butyl rubbers.

Composites of this invention include complex composites having subregions containing a second polymeric material which are separate from the hydrophobic matrix formed from the polymerized LLC tails and hydrophobic polymer. The second polymeric material is introduced into hydrophilic regions of the composite to form the complex composite. For example, the second polymeric material can be introduced into the pores of the composite. In a preferred embodiment, the second polymeric material is formed in situ in the hydrophilic pores of a composite by polymerization of hydrophilic polymer precursors (hydrophilic monomers or hydrophilic lower molecular weight polymers.)

The second polymeric material can be an organic or inorganic polymer. The second polymeric material can include, among others, poly(acrylic acid), poly(acrylamide), poly(vinyl alcohol), poly(hydroxyethyl methacrylate), poly (N-vinyl pyrrolidinone), poly(thiophene), poly(ethylene glycol), poly(ethylenedioxythiophene), poly(p-xylylenetetrahydrothiophene chloride), poly(p-xylylene dimethylsulfonium chloride), poly(p-xylylenetetrahydrothiofuranyl chloride), poly(p-phenylenevinylene), or copolymers thereof. These second polymers can be formed by polymerization of one or more monomers, particularly hydrophilic and/or water-soluble monomers, by crosslinking or further polymerization of one or more hydrophilic and/or water-soluble polymers or by further polymerization of a hydrophilic or water-soluble polymer with hydrophilic monomers.

For example, poly(p-phenylenevinylene) can be formed from the water-soluble polymer precursors: poly(p-xylylene-tetrahydrothiophene chloride), poly(p-xylylene dimethylsulfonium chloride), poly(p-xylylene tetrahydrothiofuranyl chloride) or mixtures thereof by heating and elimination of the charged species. The second polymeric material can be an inorganic glass or ceramic, including those inorganic polymers described in U.S. Pat. No. 6,054,111.

Complex composite materials of this invention can have particular application for materials with interesting electrical and/or optical properties. For example, inclusion of the fluorescent polymer poly(p-phenylenevinylene) in the pores of a nanoporous polymer results in a material exhibiting fluorescence of poly(p-phenylenevinylene) at a shorter emission wavelength with 3.7 times more light per unit volume (Clark and Wooley, 1999)

A polymerizable LLC monomer has the general structure:

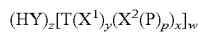

and salts thereof
where:

HY is a hydrophilic head group;

z is an integer representing the number of hydrophilic head groups, z is 1 or more, but z is typically 1 or 2; HY on the same molecule may be the same or different, but are typically the same, when z is 2 or more the HY can be linked to each other through one or more linkers L separate from T, but which may also be linked to T such that $(HY)_z$ can have the structure

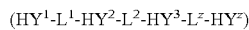

where any of $L^1$–$L^z$ can be present or absent and if present are selected from organic groups that provide the desired spacing between HY and provide for attachment to HY groups;

w is the number of T bonds or groups attached to the z HY groups, w is an integer equal to or less than z, $X^2(P)_p$ is a hydrophobic tail group which contain at least one polymerizable group P; $X^2$ and P on the same molecule may be the same or different, but are typically the same;

x is an integer of 1 or more representing the number of hydrophobic groups carrying one or more polymerizable groups, x can be 1, 2, 3, 4 or more, but is typically 1, 2, or 3;

$X^1$ is a hydrophobic tail group which does not contain a polymerizable group;

y is zero or an integer of 1 or more representing the number of hydrophobic groups in the molecule that do not carry a polymerizable group; y can be 1, 2 or more, but typically is 1 or 2;

P is the polymerizable group on a hydrophobic tail group;

p is the number of polymerizable groups on the hydrophobic tail, p is an integer of 1 or more, p is most often 1, but can be 2, 3 or more; and T represents a bond or linker group or moiety that provides for attachment of one or more hydrophobic tail groups to one or more hydrophilic head groups.

HY is a hydrophilic head group which is preferably charged at the pH at which it is to be employed (with either positive or negative charge.) HY can be selected from the groups carboxylate ($-COO^-$), poly(ethyleneoxide) ($-(CH_2-CH_2-O)_b-H$, where b is 3-about 7, and more typically is 5), sulfonate ($-SO_3^-$), sulfonate esters (e.g., $-S(OR)O_2^-$, monoester or $-S(OR)(OR')O^-$, diester), sulfonium ($-S^+(R)(R')$), phosphonate ($-PO_4^{2-}$), phosphonate esters (e.g., $-P(OR)O_3^-$, monoester or $-P(OR)(OR')O_2^-$, diester), phosphonium ($-P+(R)(R')(R'')$) or ammonium ($-N^+(R)(R')(R'')$), where R, R' and R'' can be hydrogen or an organic group which may be covalently linked to one or more of R. R' or R'' or to T to form a cyclic group. Charged groups are typically employed as salts of appropriate counter ions. HY can also be a zwitter ionic group (containing both a positive and a negative charged species, such as $-PO_3^--(CH_2)_n-N^+(R)(R')(R'')$ where R, R' and R'' are as defined above and n is an integer of 1 or more (typically 2–6).

T can be a single bond directly between HY and any $X^1$ and $X^2(P)_p$ or T can be a monovalent or multivalent linker group providing for attachment of one hydrophobic group, two such groups, three such groups, four such groups or more to one or more HY. T can also provide multiple sites for attachment of HY groups. T can be a linear, branched or cyclic (e.g., cyclohexyl group) hydrocarbon containing one or more double bonds having functionality, if necessary, for attachment to the hydrophilic head group(s) and the hydrophobic tail(s). T may be substituted with polar groups, e.g., $-OH$, -halogen groups or may contain one or more carbonyl $-CO-$ groups, one or more ether linkages $-CH_2-O-CH_2-$, one or more ester linkages $-COO-$, one or more amide linkages $-NRCO-$, where R is as defined above.) T can be aliphatic, unsaturated or aromatic. T can be a cyclic hydrocarbon or ether with appropriate functional groups for linking to HY and hydrophobic groups. T can be a saccharide, particularly a monosaccharide or a polyhydroxylated alkyl group T can be an aromatic group, having one or more (typically 1 or 2) aromatic rings which include heteroaromatic rings. T can provide for selected spacing (by variation of its size or length) between HY groups, between hydrophobic groups, or between HY and hydrophobic groups.

Multiple HY groups may be linked in series with intervening $L^{1-z}$ which groups contain a linear or branched chain having from 1 to about 10 and typically 2 to about 6 carbon atoms, which may be interrupted with one or more heteroatoms (($-O-$, $-NR^1-$, $-S-$, where $R^1$ is hydrogen, an alkyl group or an acyl group), with one or more unsaturated groups, including aromatic groups (e.g., phenyl groups), double bonds or triple bonds. Carbon atoms in $L^{1-z}$ chains may be interrupted with or substituted with groups that do not disrupt the hydrophilic nature of the combined HY groups. In preferred embodiments the $L^{1-z}$ groups are $-(CH_2)_m-$ groups (where m is an integer from 1 to about 10, more typically 1, 2, 3, 4, 5 or 6 and most typically m is 2, 3 or 4 or $-(CH_2)_p-O-(CH_2)_q-$ groups where p and q are 1 or 2.

Polymerizable groups include any groups that can be polymerized by any known means the structures of which are compatible with the formation of LLC assemblies. Of particular interest are groups that can be polymerized by irradiation by light (typically light of selected wavelength), i.e., photopolymerizable groups. Suitable polymerizable groups include acrylate, methacrylate, diene, vinyl, (halovinyl), styrenes, vinylether, hydroxy groups, epoxy or other oxiranes (halooxirane), dienoyls, diacetylenes, styrenes, terminal olefins, isocyanides, acrylamides, and cinamoyl groups.

The different $X^1$ and $X^2$ in a given molecule can be the same or different groups. $X^1$ and $X^2$ are hydrophobic groups having from about 7 to 24 unsaturated carbon atoms which may be linear or branched or may contain portions that are cyclic. The unsaturated carbon chains are optionally interrupted with one or more heteroatoms ($-O-$, $-NR^1-$, $-S-$, where $R^1$ is hydrogen, an alkyl group or an acyl group), with one or more unsaturated groups, including aromatic groups (e.g., phenyl groups), double bonds or triple bonds. Carbon atoms in $X^1$ and $X^2$ chains may be interrupted with or substituted with groups that do not render the group as a whole hydrophilic. The $X^2$ groups contain p polymerizable groups P which may interrupt the carbon chain of the hydrophobic tail or which may be substituted on one or more or between one or more of the carbons of the tail. Again introduction of the polymerizable group or groups into the $X^2$ tail does not render the tail hydrophilic.

The LLC monomers may be salts or complexes containing suitable counterions. For example, they may be salts of an LLC anion with a metal cation (e.g., an alkali metal, an alkaline earth metal, a transition metal, a lanthanide metal). More specifically the LLC monomer may be a salt or complex comprising Na, Li, K, Rb, Cs, Be, Mg, Ca, Sr, Ba, or Ra cations (more typically Na, Li, K, Cs, Mg, or Ca cations) or comprising copper(I), copper(II), cadmium(II), europium(III), cobalt(II), cobalt(III), silver (I), nickel (I), nickel(II), platinum(II), platinum (IV), gold(I), gold(III), manganese (II), manganese (III), iron (II), iron (III), zinc (II), chromium(II), chromium(III), vanadium(I), and titanium (II) cations.

Composites containing transition metal ions have particular membrane applications, for example in facilitated transport membranes e.g., for the separation of olefins from alkanes. For example, porous membranes containing acids that have been ion-exchanged with $Ag^+$ exhibit selectivity for the separation of ethylene from ethane (U.S. Pat. Nos. 4,614,524 and 5,670,051.) U.S. Pat. No. 6,670,051 describes a reactive membrane for olefin/paraffin separation consisting of a polymer backbone(i.e. poly(ethylene oxide), poly(ether ester amide) or poly(epichlorohydrin)) containing oxygen groups to bind to silver ions.

Composite materials containing transition metals can also have catalytic applications. One exemplary application is the destruction of toxic or harmful materials. Chemical warfare agents, e.g., sarin gas, can be hydrolyzed by metal ion catalyzed hydrolysis (e.g., $Cu^{2+}$ catalyzed hydrolysis as described by Wamer-Jauregg et al., 1955. A nanoporous membrane prepared using composite materials of this invention and containing $Cu^{2+}$ or other metal catalyst within the pores of the membrane has application in protective equipment against chemical warfare agents, e.g., sarin gas. More specifically, nanoporous membranes prepared using butyl rubber composite materials and which contain $Cu^{2+}$ or other metal catalyst within the pores of the membrane provide not only for low permeation of such chemical warfare agents but also provide for catalytic destruction of such agents.

The LLC monomers may be salts of a LLC cation with an suitable anion, e.g., a halide, acetate or other carboxylate anion, a halogenated carboxylate anion (e.g., trifluoroacetate), aromatic anions (e.g., benzoate or halogenated benzoate), or polyoxometalates.

In specific examples, polymerizable LLC monomers of this invention include those in which:

T is a phenyl ring carrying substitution needed to attach hydrophobic groups;

T is a single bond;

T is a straight-chain alkyl group;

T is a branched chain alkyl group; or

T is a cyclic alkyl group;

T is a monosaccharide;

where all T groups carry substitution as needed to attach hydrophobic groups or HY groups;

HY is one carboxylate group;

HY is two or three carboxylate groups;

HY is a sulfonate group

HY is a phosphate group;

HY is a phosphate group linked to an amine group to provide a zwitter ionic group;

HY is a phosphonium group;

HY is an ammonium group;

HY is a quaternary ammonium group;

y is zero;

x is 1;

x is 2;

x is 3;

z is 1;

z is 2;

$X^2$ is a straight-chain alkyl;

$X^2$ is a branched alkyl;

where $X^2$ groups have substitution as needed to attach P groups;

$X^1$ is a straight-chain alkyl group;

$X^1$ is a branched alkyl group;

L is a $-(CH_2)_m-$ group where m is 2–8, inclusive (m is 2, 3, 4, 5, 6, 7, or 8), where L groups contain substitution as needed to attach HY groups P is a diene linked to the end of the $X^2$ chain;

P is a diene which interrupts the $X^2$ chain;

P is a cis diene;

P is a trans diene;

P is a styrene;

P is a vinyl group;

P is an acrylate group;

P is a methacrylate group;

P is an epoxy group;

the polymerizable group is linked to the $X^2$ group by an ester linkage;

is a mixture of isomers;

LLC monomers of this invention include any combination of the above listed definitions of groups.

FIGS. 1A–D illustrate exemplary structures of LLC monomer of this invention.

Specific LLC of this invention include those having the structures

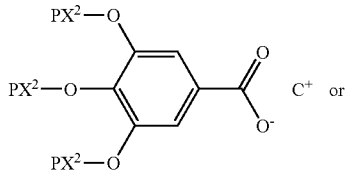

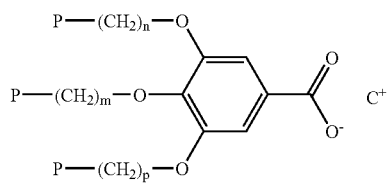

where $C^+$ is a suitable cation, n, m and p are integers ranging from 7 to 24, which may be the same or different, and P and $PX^2$ are defined above. In the $PX^2$ group, the P group can be bonded anywhere to or within the hydrophobic tail $X^2$ so long as the group remains available for polymerization. Preferably m, n and p range from about 10 to about 20. Preferably n=m=p. Preferred P are dienes, acrylate or methacrylate.

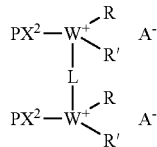

where W is nitrogen or phosphorous, A- is a suitable anion (where two monovalent anions may be replaced with a suitable divalent anion), $PX^2$, L, R and R' are as defined above. Preferred $PX^2$ are P—$(CH_2)_m$- groups, where different m on the molecule may be different, m is an integer ranging from 7 to 24. Preferred m range from about 10 to about 20 and preferably m in both hydrophobic tails are the same. P in different $PX^2$ groups may be the same or different. Preferred P are dienes. Preferred R and R' are methyl groups.

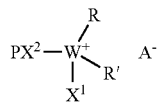

where W is nitrogen or phosphorous, A− is a suitable anion; $PX^2$, L, R and R' are as defined above. Preferred $PX^2$ are P—$(CH_2)_m$— groups, where m is an integer ranging from 7 to 24 and preferably m is about 10 to about 20. Preferred $X^1$ are $CH_3$—$(CH_2)_n$- groups where n is an integer ranging from 7 to 24 and preferably about 10 to about 20. Preferably the alkyl chains in both tails are about the same (e.g., m=n±1–2. Preferred P are dienes. Preferred R and R' are methyl groups.

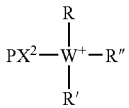

where W is nitrogen or phosphorous, $PX^2$, R, R', R" are defined as above. Preferred $PX^2$ are P—$(CH_2)_m$- groups, where m is an integer ranging from 7 to 24 and preferably m is about 10 to about 20. Preferred P are acrylates. Preferred R and R' are methyl groups.

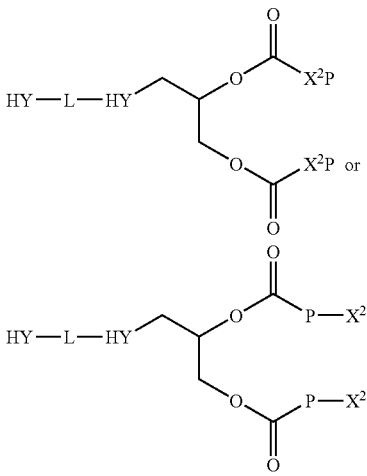

where HY, L, P and $X^2$ are defined above. In the first illustrated structure, the P group can be bonded anywhere to or within the hydrophobic tail. In the second illustrated structure, the $X^2$ tail is attached to the T group via the polymerizable group P. Preferred P are dienes, Preferred $X^2$ are straight-chain alkyl or branched chain alkyl group (particularly with the branch at the chain end distal from the P group.) having from 7 to about 24 carbon atoms. (more preferably about 10 to about 20 carbon atoms) or monoolefin tails having 7 to 24 carbon atoms or preferably having about 10 to about 20 carbon atoms. Preferably both $X^2$ are the same. Preferably both P are the same. T in this case is derived from a glycol. Preferred HY-L-HY is $N^+(R)(R')(R'')$—$(CH_2)_m$—$P^-(O_3)$—O- where R, R', R" and m are as defined above (m=1–10, preferably 2–8.)

Figure 2A:
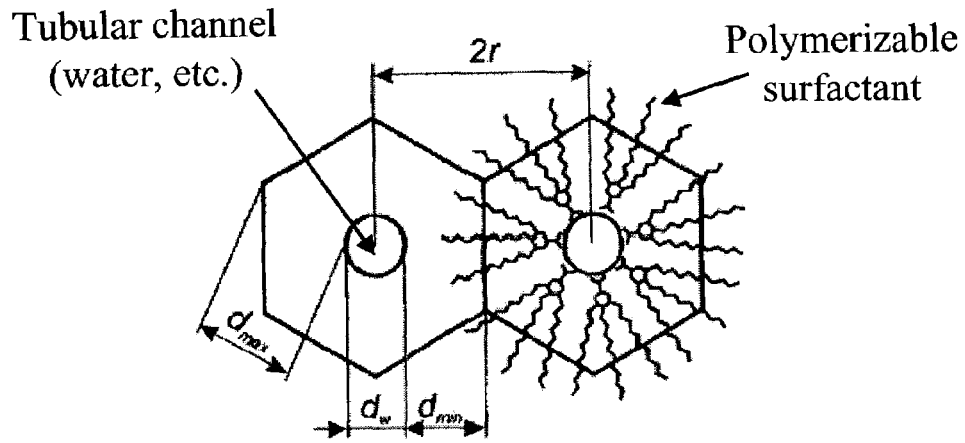
FIG. 2A illustrates the inverted hexagonal phase structure.
Figure 2B:
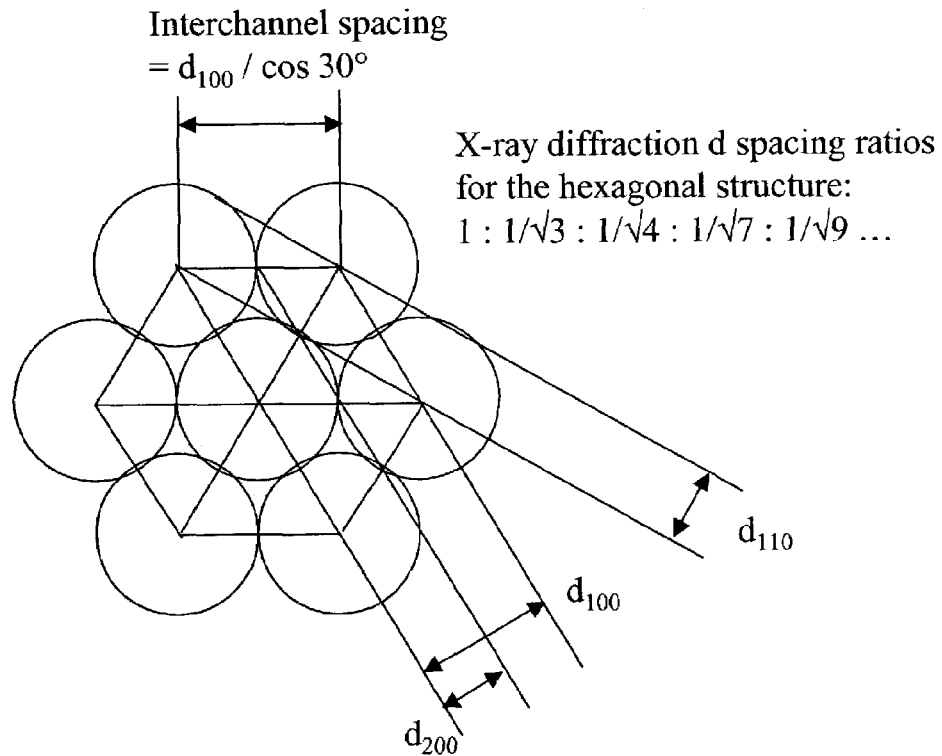
FIG. 2B illustrates interchannel spacing, and X-ray diffraction d-spacings in the hexagonal phase.

The structure of lyotropic liquid crystal assemblies can be evaluated by using two experimental techniques: X-ray diffraction and polarized light microscopy. The inverted hexagonal phase, as illustrated in FIG. 2A, for example, exhibits birefringence and generates a colorful image when viewed by polarized light microscopy. Additionally, the hexagonal structure generates a characteristic X-ray diffraction pattern. The $d_{100}$ plane and the $d_{110}$ plane generate X-ray reflections at an interval of $1:1/\sqrt{3}:1/\sqrt{4}:1/\sqrt{7}:1/\sqrt{9}$:etc.

FIGS. 2A and B illustrate the x-ray scattering for a hexagonal crystal structure. The bi-continuous cubic phase is non-birefringent and therefore exhibits a black image when viewed using polarized light microscopy (when polarizers are 90° out of alignment). The bi-continuous cubic structures also generates a characteristic X-ray diffraction pattern that follows the sequence $\sqrt{(h^2+k^2+l^2)}$, where h, k and l are integers (D. Mannock, 2001.) There are many types of cubic phases (i.e. Pn3m and Pm3n (double diamond cubic "$Q_{II}$" and "$Q_{I}$"), Im3m (plumber's nightmare cubic), and others such as Ia3d (X-ray reflection spacings of $\sqrt{6}$, $\sqrt{8}$, $\sqrt{14}$ corresponding to the 211, 220, and 321 planes, etc.).

In general, polymer composites and complex composites of this invention can be formed using any LLC assembly structure. Preferred polymer composites of this invention are formed employing hexagonal LLC phases.

Figure 5B:
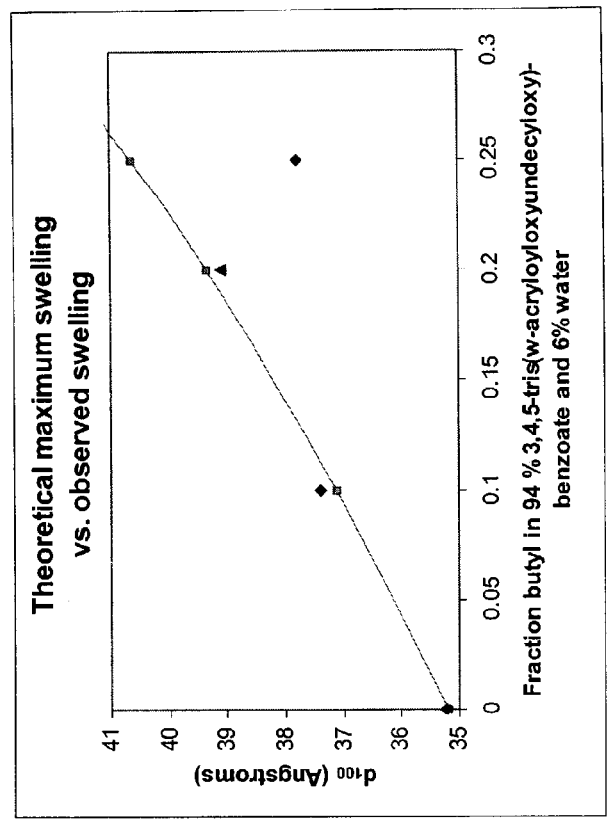
FIG. 5B is an enlargement of the graph of FIG. 5A.
Figure 5A:
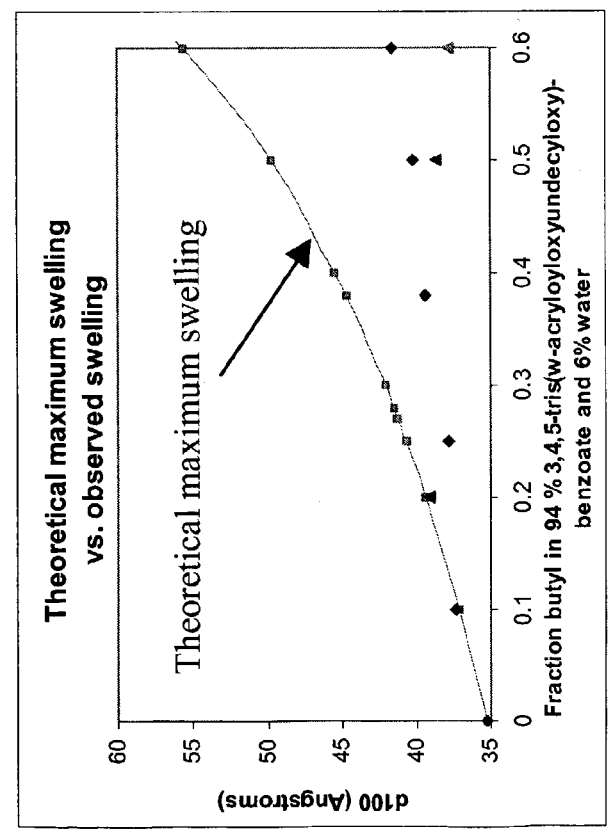
FIGS. 5A and B provides data on the d-spacing of the inverted hexagonal phase ($d_{100}$) with increasing butyl rubber content.
Figure 5C:
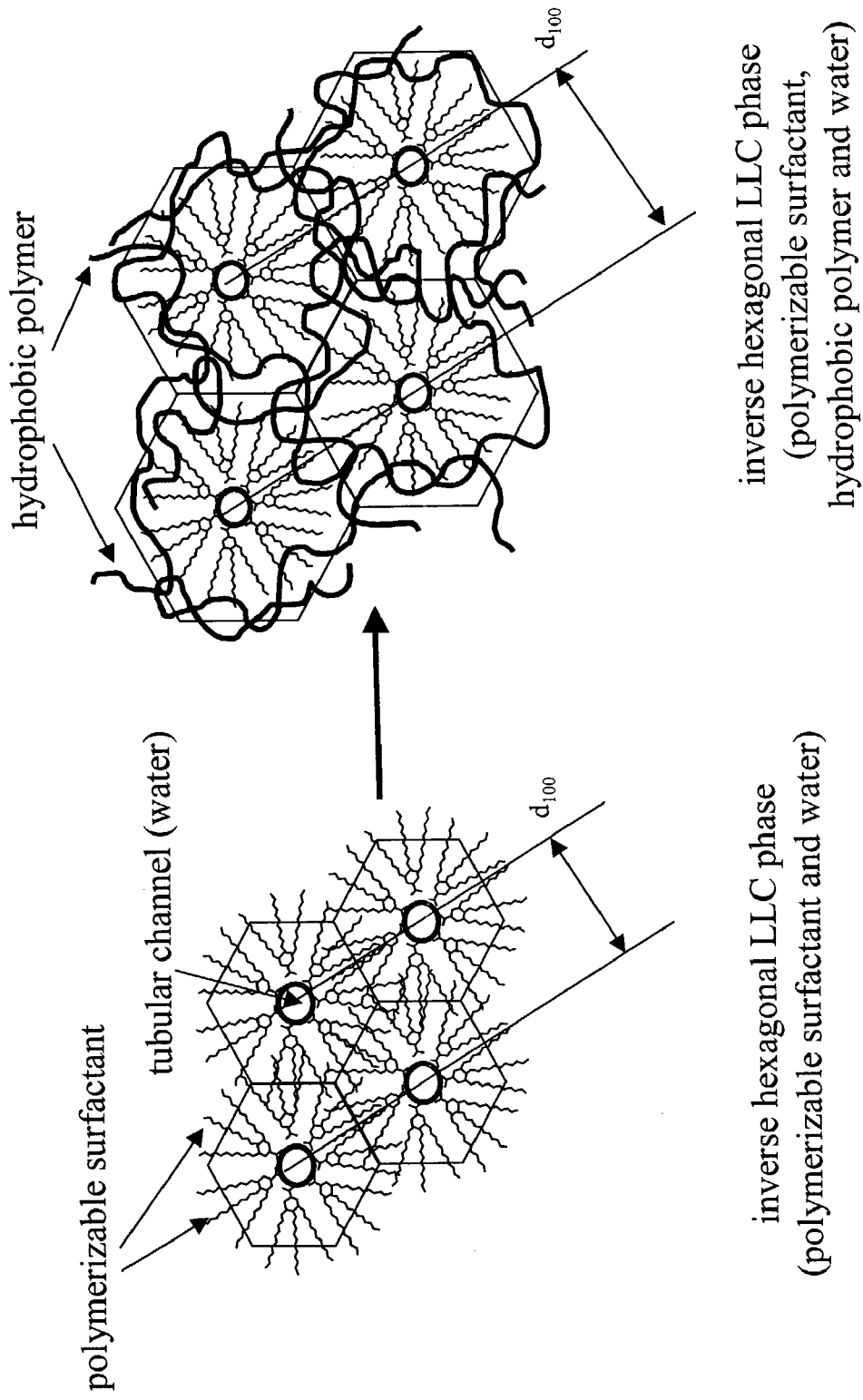

In the methods herein, polymerizable LLC molecules are used to "lock in" the phase structures in the polymer composite. This is done by first allowing for the self assembly into the ordered phases then polymerizing the polymerizable functional groups on the polymerizable LLC molecules. FIG. 5C shows a polymerizable surfactant and the packing structure of the inverted hexagonal phase it forms. The polar headgroups form a water channel which makes a roughly 1.2 nm diameter pore. The separation between centerline of pores is about 35.2 angstroms. The cylindrical pores extend linearly through the domain of the crystal. When butyl rubber, a hydrophobic polymer, is added to the organic domains with the retention of the liquid crystal structure the structure "swells" and the corresponding $d_{100}$ plane increases as illustrated in FIG. 5C. A swollen LLC phase is one structure that can be formed by combining the hydrophobic polymer and the LLC molecules herein. In such a swollen phase, the hydrophobic polymer is in the hydrophobic domains of the LLC phase which are defined by the hydrophobic tails of the LLC molecules. The unit cell size of the swollen LLC is larger than the standard LLC phase because the crystal structure must increase to allow for the incorporation of additional materials.

Figures 6A, 6B, 6C:
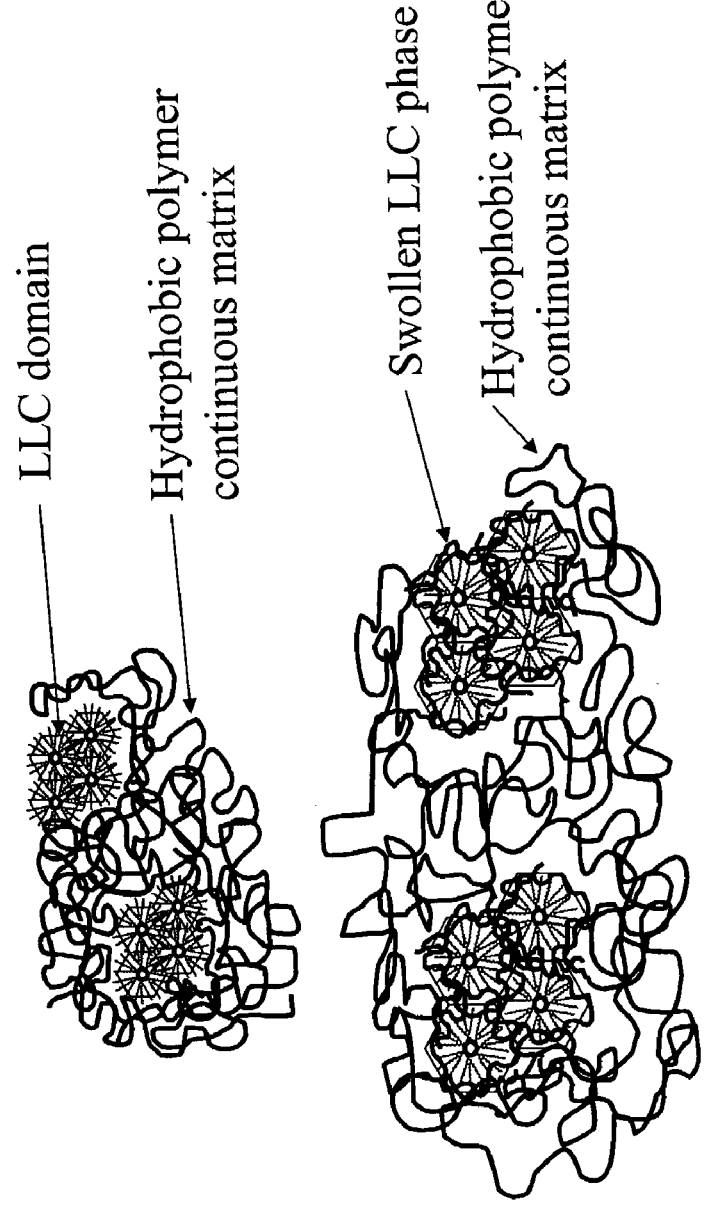
FIG. 6 illustrates structures that may be present in composites of polymerizable surfactants and hydrophobic polymers.

FIGS. 6A–C illustrate the types of structures that can be present in composites with hexagonal LLC structure formed from combinations of polymerizable LLC molecules and hydrophobic polymers. The composite can be entirely (or mostly) a "swollen LLC phase" (FIG. 6A) in which the hydrophobic polymer co-occupies the hydrophobic tail region of the LLC assembly. A second type of structure is one in which the LLC is not swollen and exists in separated domains within the continuous hydrophobic polymer matrix (FIG. 6B). A third type of structure is where domains of the LLC are "swollen" with at least a portion of the added polymer and exist within a continuous matrix comprising the remainder of the hydrophobic polymer (FIG. 6C). A continuous organic (or hydrophobic) phase can be formed in the materials of this invention from combined swollen LLC phases, e.g., swollen inverse hexagonal phases, from combined hydrophobic domains of LLC phases and separate hydrophobic polymer domains or from a combination of polymer-swollen LLC phases and separate hydrophobic polymer domains.

The present invention provides methods for forming nanoporous materials that can be used to form membranes. These membranes may be chemically selective. One example is a selective membrane to prevent the penetration of chemical warfare agents or other harmful chemicals, while allowing the penetration of water vapor. Specifically, breathable rubber materials are formed from a self-assembled nanocomposite that consists of polymerizable surfactants and butyl rubber. The surfactants form the nanopores that are about 1 nm in diameter that allow water vapor to permeate through the material, while slowing the permeation of chemical warfare agents (CWA), or CWA simulants. The use of high molecular weight polymers having a molecular weight greater than 1000 Daltons or containing at least 20 monomeric repeat units are preferred in this application. Preferably, the polymers are linear, or mostly linear.

Using polymerizable surfactants, the nano-scale structure can be "locked" by polymerization, preferably a photopolymerization reaction. The nanostructure of the polymerized LLC phase generates the pore structure. Once this pore structure is fixed, the butyl rubber (or other elastomer or synthetic rubber polymer) can be vulcanized (or crosslinked) at elevated temperature without loss of the liquid crystal structure to form a crosslinked rubber or elastomer containing nanometer-scale pores. For the purpose of this invention, nanopores are defined as pores having a diameter of 0.3 to 50 nm, and preferably 0.3 to 2 nm.

Figure 3:
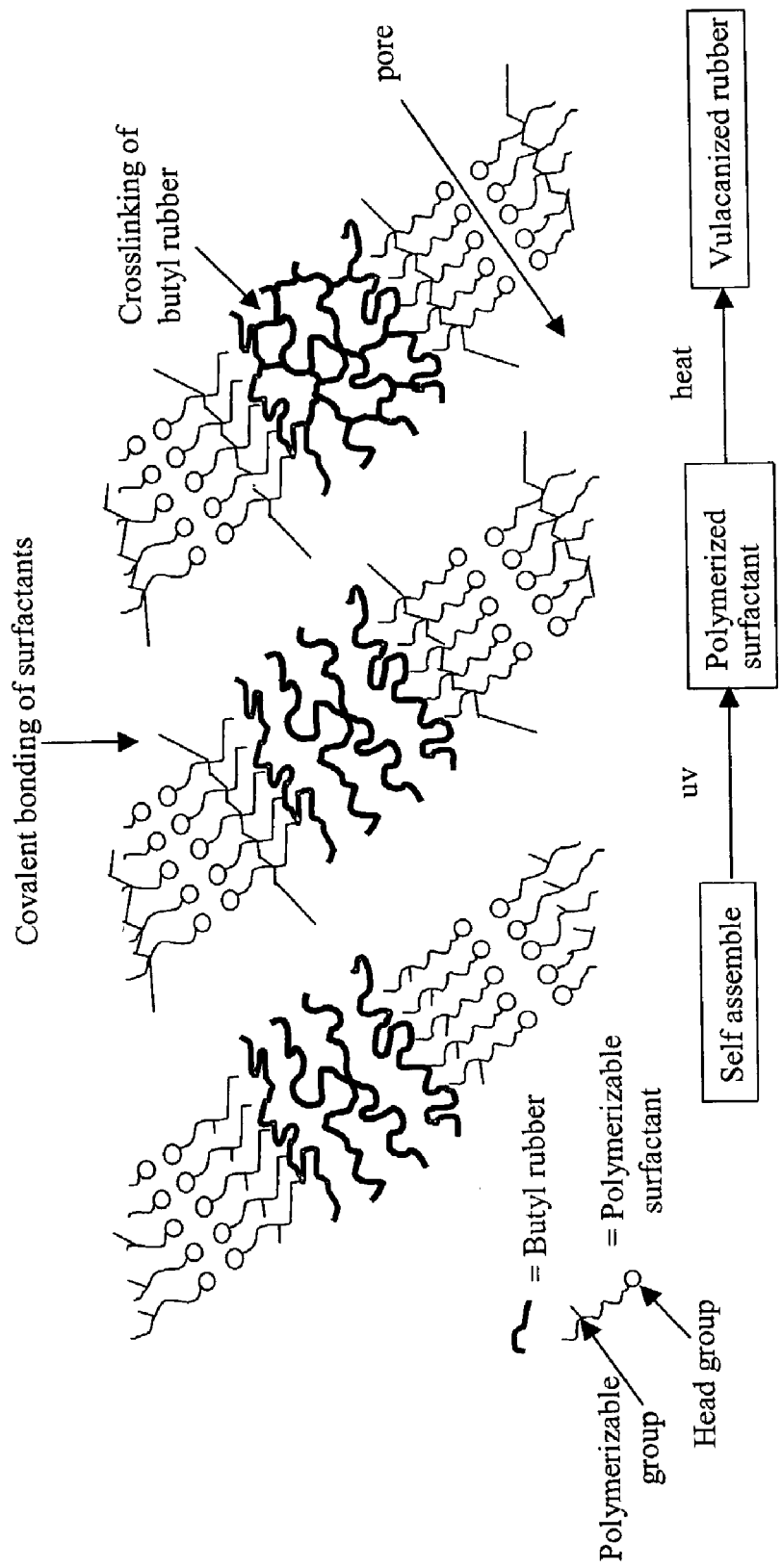
FIG. 3 illustrates the proposed mechanism for the formation of a nanoporous polymerizable surfactant/butyl rubber (or other hydrophobic polymer) nanocomposite.

FIG. 3 illustrates a possible mechanism for producing breathable butyl rubber. The process begins by forming a self-assembled nanostructure, preferably a structure that forms hydrophilic channels, such as an inverted hexagonal phase. Certain LLC molecules, including polymerizable LLC molecules, are known to spontaneously form an inverted hexagonal phase. A combination of such polymerizable LLCs with butyl rubber and a small amount of water forms the desired LLC phase with hydrophilic channels. In preferred embodiments, the LLC monomer is 5 to 99% (wt.) of the LLC composition prior to polymerization; butyl rubber is 0.1 to 95% (wt.) of the composition, and water is 0–20% (wt.) of the composition (exclusive of low levels of any additives.) In more preferred embodiments, the LLC monomer is 40–80% of the LLC composition prior to polymerization; butyl rubber is 20–60% (wt.) of the composition, and water is 3–7% (wt.) of the composition (exclusive of low levels of any additives.). The polar head groups face toward water domains while the organic tails point toward butyl rubber domains.

There are several possible processing methods for obtaining a structure such as the one shown in FIG. 3 that represents the "self assembled" starting point of the polymerization process. In one method, the LC monomer and water are combined and mixed. A typical composition that results in the inverted hexagonal phase is 94 wt. % 3,4,5-tris(ω-acryloyloxyundecyloxy)benzoate and 6% water. Next, butyl rubber is dissolved in a solvent such as hexane or toluene (about 20% to 30% butyl rubber in solvent) and then the LC monomer paste is dispersed into the butyl rubber solvent solution and thoroughly mixed. If the solvent evaporates during the mixing process, then more solvent can be added to result in a low viscosity suspension. Commercial butyl rubber can be employed. Butyl rubber typically has a viscosity average molecular weight of between 350,000 and 450,000 g/mol. Exxon Butyl 165 is suitable for use in preparation of membranes. Exxon Butyl 165 is a commercial product prepared by copolymerizing small amounts of isoprene, 1 to 3% of the monomer feed, with isobutylene, catalyzed by $AlCl_3$ dissolved in methyl chloride. Exxon Butyl 165 has 1.2 mole % unsaturation (from isoprene) and a Mooney Viscosity of 45+/−4

The LLC/butyl rubber/solvent mixture can be cast into films, and as the solvent evaporates, the surfactant, water and butyl rubber self assemble into an inverse hexagonal structure as illustrated in FIG. 5C or FIGS. 6A–C.

Because diffusion in the LLC phase is lower than in the isotropic melt phase, an alternative process method can be employed. In this method the LC monomer and water are combined and mixed. A typical composition that results in the inverted hexagonal phase is 94 wt. % 3,4,5-tris(ω-acryloyloxyundecyloxy)benzoate and 6% water. Next, butyl rubber is dissolved in hexane or toluene (or similar solvent) at a concentration of about 20% to 30% by weight butyl rubber. The LLC paste is dispersed in the butyl rubber/solvent solution and the dispersion is heated to above the isotropic clearing point. The mixture is now in the isotropic phase and more efficient intermixing of the LC monomer and the butyl rubber can occur. After mixing above the clearing point, the solution is cooled and the solvent is removed (after film casting if desired) and the material self assembles into the desired LLC phase structure such as those illustrated in FIG. 5C or 6A–C. It has been found that this method of mixing results in the greatest degree of "swelling" of the LLC structure with the added polymer.

The specific polymerizable LLC surfactants employed in the example membrane preparations contain an acrylate functional group at the end of the three tails. These LLC molecules are photopolymerized after formation of the LLC assembly containing butyl rubber, by a free radical reaction to form a crosslinked network with retention of the inverse hexagonal phase structure. Once the surfactants are photopolymerized, the nanostructure is exceptionally stable and can be heated to well over 200° C. and easily heated to standard vulcanization temperatures (150–160° C.) without loss of the nano-scale order. Note: the clearing point (melting point) for useful LLCs is generally much lower than the vulcanization temperatures of rubber, for example, the clearing point of 3,4,5-tris(ω-acryloyloxyundecyloxy)benzoate is about 62° C. in the butyl rubber composite. Therefore, it would not be possible to heat a non-polymerized LLC assembly/butyl rubber composite system to 150° C. to vulcanize the butyl rubber and maintain the nanostructure. (The vulcanization would occur after the LC monomers had cleared and formed an isotropic melt.) With the LC monomers crosslinked and locked into the nanostructure, vulcanization of the linear butyl rubber, by heating with curatives present to form a crosslinked rubber is the final step of the process of making the nanoporous, breathable butyl rubber. The final material is a composite of the crosslinked surfactants and the crosslinked butyl rubber. Self-assembled nanoporous structures can be made in combinations containing up to 95% (by weight) butyl rubber. Preferred butyl rubber composites of more homogeneous compositions where most of the butyl rubber is incorporated into the swollen LLC phase are those containing from about 20 to 30% (by weight) butyl rubber.

Exemplary composites of this invention prepared using butyl added to the organic (hydrophobic) domains of LLC have several advantages. The resulting porous materials exhibit increased flexibility and toughness compared to polymerized LLC and further the addition of butyl rubber to the organic phase of the composite can increase diffusion resistance and the addition of butyl rubber can increase the chemical resistance of the nanocomposite.

The phase behavior of the lyotropic liquid crystal/butyl rubber system was examined by preparing samples that have varying compositions of water, LLC monomer and butyl rubber (Butyl 165, Exxon). The extent of each lyotropic liquid crystalline phase was determined by variable-temperature polarized light microscopy and X-ray diffraction using an Inel CPS-120 X-ray diffractometer equipped with a hot stage for temperature control. Specimens for X-ray diffraction were prepared in 1.0 mm internal diameter glass capillary tubes using centrifugation or positive pressure to load the samples into the capillaries.

Figures 4A, 4B:
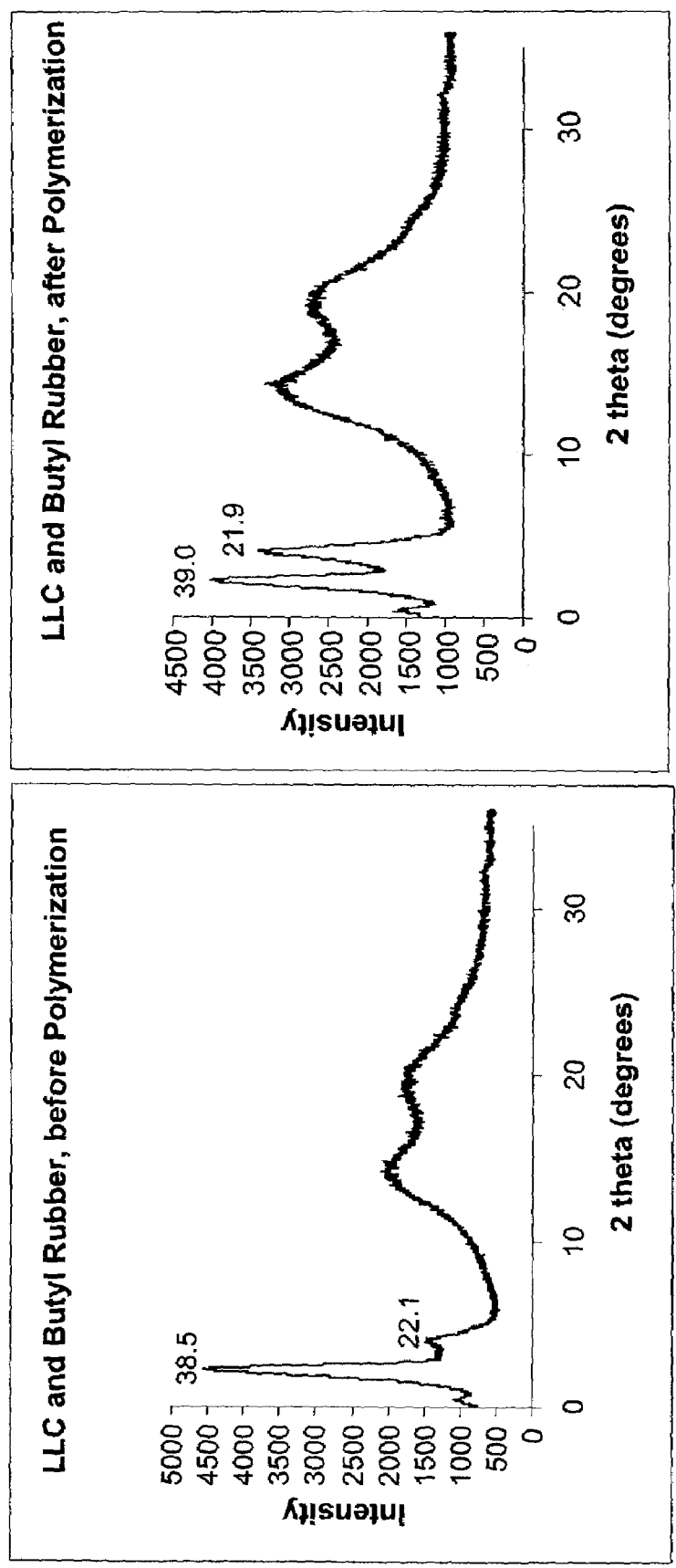
FIGS. 4A and B provides X-ray diffraction patterns for the inverted hexagonal phase before (A) and after (B) photopolymerization.

FIG. 4A shows the X-ray diffraction pattern for the inverted hexagonal phase of samples that contain 77 weight % surfactant, and 16 weight % butyl rubber before polymerization of the LLC. FIG. 4B is the X-ray diffraction pattern after photopolymerization. The peaks at 38.5–39 angstroms and 22.1–21.9 angstroms correspond to the repeat structure of the hexagonal phase, with the larger (38.5–39 angstroms) corresponding to the $d_{100}$ plane and the smaller to the $d_{10}$ plane (corresponding to $1:1/\sqrt{3}$ ratio). The d-spacings for the first two peaks are listed on the graphs, although the x axis is in degrees 2-theta. The very broad peaks at 10 to 25 degrees 2-theta are an amorphous scatter caused by the butyl rubber polymer. The increase in the intensity of the peak at 21.9 angstroms for the photopolymerized sample (FIG. 4B) is due to the increase in the X-ray density that is induced by the reaction of the acrylate double bonds. The inverted hexagonal phase structure is retained upon photopolymerization (crosslinking of the LLC molecules).

The d-spacing of the liquid crystal structure increases with the addition of more butyl rubber. The structure must swell to allow the incorporation of additional mass. FIGS. 5A and B show the increase in d-spacing for the hexagonal phase (using sodium 3,4,5-tris(ω-acryloyloxyundecyloxy) benzoate) with increasing levels of butyl rubber. FIG. 5B is an enlargement of the graph of FIG. 5A. Swelling of the hexagonal LLC phase and the increase in d-spacing is illustrated in FIG. 5C. This increasing d-spacing is evidence of forming a nanocomposite of butyl rubber, surfactant and water, with extremely well-defined pore structures. The theoretical maximum swelling was calculated by assuming equal densities and ideal mixing. The theoretical maximum swelling is shown as the solid line on the graphs of FIGS. 5A and B. Note that composites with up to 20% butyl rubber have been made with a swelling equivalent to the theoretical maximum swelling. Some composites had swellings equivalent to the theoretical maximum swelling for 30% butyl rubber content.

In the following examples monomeric lyotropic liquid crystals are used that have been prepared by methods published in literature. These methods for synthesizing surfactants that have aliphatic tails ending in either an acrylate, methacrylate or diene have been published and are understood by those skilled in the art. The synthesis of 3,4,5-tris(ω-acryloyloxy undecyloxy)benzoate and similar surfactant materials containing either acrylate, methacrylate or diene functional groups has been described by Gin et al., 2001, U.S. Pat. No. 5,849,215, and Pindozla et al., 2001. Synthesis of Gemini surfactants, such as those shown in FIG. 1B, with the structure $\{(CH_2=CHCH=CH(CH_2)_xP(CH_3)_2(CH_2)_{y/2})_2$ x=8,10,14; y=2,6,8,$\}$ have been published by Pindozla and Gin, 2001.

EXAMPLES

Example 1

Procedure for Preparation of LLC Pastes Containing Sodium 3,4,5-tris(ω-acryloyloxy undecyloxy)-benzoate, Water, and Exxon Butyl 165 (27 wt % Solution in Hexanes)

Mix the following components: sodium 3,4,5-tris(ω-acryloyloxyundecyloxy)benzoate (92.5 wt %), water (5.9 wt %), and photoinitiator (2-hydroxy-2-methylpropiophenone, 1.6 wt %). To the LLC paste obtained add a butyl rubber solution (27 wt % in hexanes, Butyl 165, Exxon) and then thoroughly mix. The final composition is (after hexanes evaporate during the mixing process): acrylate monomer (sodium salt) (77 wt %), water (4.9 wt %), photoinitiator (2-hydroxy-2-methylpropiophenone, 1.3 wt %), and butyl rubber (16.8 wt %). "Exxon Butyl 165" is a butyl rubber having 1.2 mole % unsaturation (from isoprene) and a Mooney viscosity of 45±4. Butyl rubber is prepared by copolymerizing small amounts of isoprene (1 to 3% of the monomer feed) with isobutylene catalyzed by $AlCl_3$ dissolved in methyl chloride.

X-ray Diffraction and Polarized Light Microscopy Characterization:

X-ray profile of LLC from Example 1 in the preparation showed peaks at 38. 2 Å and 20.7 Å, indicating an inverted hexagonal phase. After photopolymerization, the peaks are at 39.0 Å and 21.9 Å, indicating the phase is retained. Polarized light microscopy showed the presence of a birefringent LLC phase consistent with the inverted hexagonal phase.

Example 2

Alternate Procedure for Preparation of LLC Pastes Containing Sodium 3,4,5-tris(ω-acryloyloxy undecyloxy)-benzoate, Water, and Butyl 165 (27 wt % Solution in Hexane)

Mix the following components: sodium 3,4,5-tris(ω-acryloyloxyundecyloxy)benzoate (77 wt %), water (4.9 wt %), photoinitiator (2-hydroxy-2-methylpropiophenone, 1.3 wt %) and butyl rubber (16.8 wt % butyl rubber as a 27 wt % solution in hexane. Note the hexane will be evaporated and is not including the wt % calculations). Re-mix the components. The hexane is allowed to evaporate.

Example 3

Procedure for the Preparation of Inverted Hexagonal Structured Nanocomposite of 20% Butyl Rubber (Vulcanized) and Sodium 3,4,5-tris(ω-acryloyloxy undecyloxy)-benzoate Thoroughly mix the following components: 0.05 g water, 0.012 g 2-hydroxy-2-methylpropiophenone (Aldrich) and 0.75 g sodium 3,4,5-tris(ω-acryloyloxyundecyloxy)benzoate to form an LLC monomer paste. 2-hydroxy-2-methylpropiophenone is a photoinitiator used at a loading level of 1.6 wt % based on the polymerizable surfactant. In a separate mixture combine 0.2 g butyl rubber (butyl 165, Exxon), 0.004 g (2 parts per hundred resin based on butyl rubber) tetramethylthiuram disulfide (TMTDS, Alfa Aesar), 0.004 g (2 parts per hundred resin) 4,4'-dithiodimorpholine (DTDM, Flexsys), and 1 g toluene (Aldrich). The combination of butyl rubber and curatives in toluene is mixed until the butyl rubber is fully dissolved (about 24 hours). The toluene/butyl rubber solution is combined with the LLC monomer paste and mixed. Toluene is then removed under vacuum. If the material is in a desired shape, it is next photopolymerized with either a low-output (1 to 10 mW/cm²) ultra-violet lamp (Blakray) for 3 hours, or by a high-output (1 to 20 W/cm2) ultraviolet light spot cure apparatus (Novacure 2100, EXFO) for 1 to 5 minutes. This crosslinks the LLC monomers and locks in the nanostructure. The sample is then heated to 160° C. for 1 to 2 hours to vulcanize the rubber.

Alternative processing step: To make nanoporous membranes or thin films, dissolve the final mixture in toluene (or do not remove the toluene from the original mixture) and wet cast films on a substrate such as a polyethersulfone or a polyethylene microporous membrane support. Allow the toluene to evaporate to result in a dry film. Additional layers can be applied and the solvent removed again. The curing process is identical to the first processing method: ultraviolet light is used to cure the surfactants by either a low-output (1 to 10 mW/cm2) ultra-violet lamp (Blakray) for 3 hours, or by a high-output (1 to 20 W/cm2) ultraviolet light spot cure apparatus (Novacure 2100, EXFO) for 1 to 5 minutes, followed by heating to 160° C. for 1 to 2 hours to vulcanize the rubber.

Example 4

Procedure for the Preparation of Inverted Hexagonal Structured Nanocomposite of 50% Butyl Rubber and Sodium 3,4,5-tris(ω-acryloyloxy undecyloxy)-benzoate Mix 0.083 g water, 0.012 g 2-hydroxy-2-methylpropiophenone (Aldrich) and 0.75 g sodium 3,4,5-tris(ω-acryloyloxyundecyloxy)benzoate in a centrifuge tube. After mixing centrifuge at 2000 G for 15 minutes to remove the portion of the sample on the walls of the centrifuge tube. Repeat the mixing for a total of three times. 2-hydroxy-2-methylpropiophenone is a photoinitiator used at a loading level of 1.6 wt % based on the polymerizable surfactant. In a separate mixture combine 0.833 g butyl rubber (butyl 165, Exxon), 0.0166 g (2 parts per hundred resin based on butyl rubber) tetramethylthiuram disulfide (TMTDS, Alfa Aesar), 0.0166 g (2 parts per hundred resin) 4,4'-dithiodimorpholine (DTDM, Flexsys), and 4.165 g toluene (Aldrich). This butyl rubber, curatives, and toluene solution is mixed until the butyl rubber is fully dissolved (about 24 hours). The toluene/butyl rubber solution is combined with the LC monomer paste (water, 2-hydroxy-2-methylpropiophenone and sodium 3,4,5-tris(ω-acryloyloxyundecyloxy)-benzoate) and mixed three times (and centrifuged each time if needed.) The toluene is removed under vacuum. If the material is in a desired shape, it is next photopolymerized with either a low-output (1 to 10 mW/cm²) ultra-violet lamp (Blakray) for 3 hours, or by a high-output (1 to 20 W/cm²) ultraviolet light spot cure apparatus (Novacure 2100, EXFO) for 1 to 5 minutes. This crosslinks the surfactants and locks the nanostructure. The sample is then heated to 160° C. for 1 to 2 hours to vulcanize the rubber.

Alternative processing step: To make membranes or thin films, dissolve the final mixture in toluene (or do not remove the toluene from the original mixture) and wet cast films on a substrate such as a polyethersulfone microporous membrane support. Allow the toluene to evaporate to result in a dry film. Additional layers can be applied and the solvent removed again. The curing process is identical to the first processing method: ultraviolet light is used to cure the surfactants by either a low-output (1 to 10 mW/Cm²) ultra-violet lamp (Blakray) for 3 hours, or by a high-output (1 to 20 W/cm²) ultraviolet light spot cure apparatus (Novacure 2100, EXFO) for 1 to 5 minutes. followed by heating to 160° C. for 1 to 2 hours to vulcanize the rubber.

Optional additional processing step: After the vulcanization step another coating of the toluene/LLC/butyl rubber solution can be wet cast onto the membrane. Again, the ultraviolet light is used to cure the surfactants followed by heating to vulcanize the butyl rubber. This second coating (after the first vulcanization step) can fill in any defects in the membrane coating left from the first coating step.

Example 5

Procedure for the Preparation of Inverted Hexagonal Structured Nanocomposite of 20% Butyl Rubber and Sodium 3,4,5-tris(ω-acryloyloxy undecyloxy)-benzoate, with a Mixing Step in the Isotropic and Solvated Phase Mix the following components: 0.05 g water, 0.012 g 2-hydroxy-2-methylpropiophenone (Aldrich) and 0.75 g sodium 3,4,5-tris(ω-acryloyloxyundecyloxy)benzoate. 2-hydroxy-2-methylpropiophenone is a photoinitiator used at a loading level of 1.6 wt % based on the polymerizable surfactant. In a separate mixture combine 0.2 g butyl rubber (butyl 165, Exxon), 0.004 g (2 parts per hundred resin based on butyl rubber) tetramethylthiuram disulfide (TMTDS, Alfa Aesar), 0.004 g (2 parts per hundred resin) 4,4'-dithiodimorpholine (DTDM, Flexsys), and 1 g toluene (Aldrich). This combination is mixed until the butyl rubber is fully dissolved (about 24 hours). Add 0.001 g (about 1000 ppm) 4-methoxyphenol, a radical stabilizer to prevent spontaneous polymerization in the next step, and heat the solution to 62° C. (or above the isotropic clearing point). To the heated toluene solution, add the LC monomer solution/paste and mix for 2 hours. Keep the reaction vessel covered to prevent light from reaching the heated solution. Cool the mixture to 45° C. and remove the toluene under vacuum. If the material is in a desired shape, it is next photopolymerized with either a low-output (1 to 10 mW/cm$^2$) ultra-violet lamp (Blakray) for 3 hours, or by a high-output (1 to 20 W/cm$^2$) ultraviolet light spot cure apparatus (Novacure 2100, EXFO) for 1 to 5 minutes. This crosslinks the surfactants and locks the nanostructure. The sample is then heated to 160° C. for 1 to 2 hours to vulcanize the rubber.

Alternative processing step: To make membranes or thin films, dissolve the final mixture in toluene (or do not remove the toluene from the original mixture) and wet cast films on a substrate such as a polyethersulfone microporous membrane support. Allow the toluene to evaporate to result in a dry film. Additional layers can be applied and the solvent removed again. The curing process is identical to the first processing method: ultraviolet light is used to cure the surfactants by either a low-output (1 to 10 mW/cm$^2$) ultra-violet lamp (Blakray) for 3 hours, or by a high-output (1 to 20 W/cm$^2$) ultraviolet light spot cure apparatus (Novacure 2100, EXFO) for 1 to 5 minutes, followed by heating to 160° C. for 1 to 2 hours to vulcanize the rubber.

Optional additional processing step: After the vulcanization step another coating of the toluene/LLC/butyl rubber solution can be wet cast onto the membrane. Again, the ultraviolet light is used to cure the surfactants followed by heating to vulcanize the butyl rubber. This second coating (after the first vulcanization step) can fill in any defects in the membrane coating left from the first coating step.

Example 6

Procedure for the Preparation of inverted Hexagonal Structured Nanocomposite of 50% Butyl Rubber and Sodium 3,4,5-tris(ω-acryloyloxy undecyloxy)-benzoate, with a Mixing Step in the Isotropic and Solvated Phase Mix the following components: 0.0833 g water, 0.012 g 2-hydroxy-2-methylpropiophenone (Aldrich) and 0.75 g sodium 3,4,5-tris(ω-acryloyloxyundecyloxy)-benzoate in a centrifuge tube. 2-hydroxy-2-methylpropiophenone is a photoinitiator used at a loading level of 1.6 wt % based on the polymerizable surfactant. In a separate mixture combine 0.833 g butyl rubber (butyl 165, Exxon), 0.0166 g (2 parts per hundred resin based on butyl rubber) tetramethylthiuram disulfide (TMTDS, Alfa Aesar), 0.0166 g (2 parts per hundred resin) 4,4'-dithiodimorpholine (DTDM, Flexsys), and 4.165 g toluene (Aldrich). This combination is mixed until the butyl rubber is fully dissolved (about 24 hours). Add 0.001 g (about 1000 ppm) 4-methoxyphenol, a radical stabilizer to prevent spontaneous polymerization in the next step, and heat the solution to 62° C. (or above the isotropic clearing point). To the heated toluene solution, add the LLC monomer solution/paste and mix for 2 hours. Keep the reaction vessel covered to prevent light from reaching the heated solution. Cool the mixture to 45° C. and remove the toluene under vacuum. If the material is in a desired shape, it is next photopolymerized with either a low-output (1 to 10 mW/cm$^2$) ultra-violet lamp (Blakray) for 3 hours, or by a high-output (1 to 20 W/cm$^2$) ultraviolet light spot cure apparatus (Novacure 2100, EXFO) for 1 to 5 minutes. This crosslinks the surfactants and locks the nanostructure. The sample is then heated to 160° C. for 1 to 2 hours to vulcanize the rubber.

Alternative processing step: To make membranes or thin films, dissolve the final mixture in toluene (or do not remove the toluene from the original mixture) and wet cast films on a substrate such as a polyethersulfone microporous membrane support. Allow the toluene to evaporate to result in a dry film. Additional layers can be applied and the solvent removed again. The curing process is identical to the first processing method: ultraviolet light is used to cure the surfactants by either a low-output (1 to 10 mW/cm$^2$) ultra-violet lamp (Blakray) for 3 hours, or by a high-output (1 to 20 W/cm$^2$) ultraviolet light spot cure apparatus (Novacure 2100, EXFO) for 1 to 5 minutes, followed by heating to 160° C. for 1 to 2 hours to vulcanize the rubber.

Optional additional processing step: After the vulcanization step another coating of the toluene/LLC/butyl rubber solution can be wet cast onto the membrane. Again, the ultraviolet light is used to cure the surfactants followed by heating to vulcanize the butyl rubber. This second coating (after the first vulcanization step) can fill in any defects in the membrane coating left from the first coating step.

Example 7

Procedure for the Preparation of Bi-Continuous Cubic Structured Nanocomposite of 10% Butyl Rubber and a Diene Gemini Polymerizable Surfactant, with a Mixing Step in the Isotropic and Solvated Phase Mix the following components: 0.132 g water, 0.012 g 2-hydroxy-2-methylpropiophenone (Aldrich) and 0.75 g of the diene Gemini diphosphonium surfactant with tails containing 14 carbon atoms and a spacer containing 6 carbon atoms, as illustrated in FIG. 1B. This Gemini surfactant has the following chemical structure: $(CH_2{=}CHCH{=}CH(CH_2)_x P(CH_3)_2(CH_2)_{y/2})_2$ where x=10 y=6. 2-hydroxy-2-methylpropiophenone is a photoinitiator used at a loading level of 1.6 wt % based on the polymerizable surfactant. In a separate mixture combine 0.098 g butyl rubber (butyl 165, Exxon), 0.002 g (2 parts per hundred resin based on butyl rubber) tetramethylthiuram disulfide (TMTDS, Alfa Aesar), 0.002 g (2 parts per hundred resin) 4,4'-dithiodimorpholine (DTDM, Flexsys), and 0.49 g toluene (Aldrich). This combination is mixed until the butyl rubber is fully dissolved (about 24 hours). Add 0.001 g (about 1000 ppm) 4-methoxyphenol, a radical stabilizer to prevent spontaneous polymerization in the next step, and heat the solution to 85° C. (or above the isotropic clearing point). To the heated toluene solution, add the LLC monomer solution/paste and mix for 2 hours. Keep the reaction vessel covered to prevent light from reaching the heated solution. Cool the mixture to room temperature. To make membranes or thin films, wet cast films of the solution on a substrate such as a polyethersulfone or polyethylene microporous membrane support. Allow the toluene to evaporate to result in a dry film. Additional layers can be applied and the solvent removed again. The curing process is identical to the first processing method: ultraviolet light is used to cure the surfactants by either a low-output (1 to 10 mW/cm$^2$) ultra-violet lamp (Blakray) for 3 hours, or by a high-output (1 to 20 W/cm$^2$) ultraviolet light spot cure apparatus (Novacure 2100, EXFO) for 1 to 5 minutes. The rubber was vulcanized by heating to 160° C. for 1 to 2 hours.

Example 8

Procedure for Preparation of Inverted Hexagonal Structured Nanocomposite of 95% poly(vinylchloride) and the Polymerizable Lyotropic Liquid Crystal, Sodium 3,4,5-tris(ω-acryloyloxy undecyloxy)benzoate A composite is made by dissolving 0.1 g of sodium 3,4,5-tris(ω-acryloyloxy undecyloxy)benzoate and 0.0016 g 2-hydroxy-2-methylpropiophenone (Aldrich) in 20 g of tetrahydrofuran (THF), followed by dissolving 2 g of poly (vinylchloride) (PVC) in the LLC solution to form a homogeneous solution. 2-hydroxy-2-methylpropiophenone is a photoinitiator used at a loading level of 1.6 wt % based on the polymerizable surfactant. The solution is poured into a small glass dish (at room temperature) and the THF is allowed to evaporate leaving a film. Ultraviolet light is used to cure the surfactants by either a low-output (1 to 10 mW/cm$^2$) ultra-violet lamp (Blakray) for 3 hours, or by a high-output (1 to 20 W/cm$^2$) ultraviolet light spot cure apparatus (Novacure 2100, EXFO) for 1 to 5 minutes. Polarized light microscopy indicates the formation of small liquid crystal domains dispersed in the PVC film which are indicative of the presence of pores in the composite on the order of 1.2 nanometers in diameter.

Example 9

Procedure for Preparation of Inverted Hexagonal Structured Nanocomposite of 95% poly(lactic acid) and the Polymerizable Lyotropic Liquid Crystal, Sodium 3,4,5-tris(ω-acryloyloxy undecyloxy)benzoate A composite is made by dissolving 0.1 g of sodium 3,4,5-tris(ω-acryloyloxy undecyloxy)benzoate and 0.0016 g 2-hydroxy-2-methylpropiophenone (Aldrich) in 30 g of chloroform, followed by dissolving 2 g poly(lactic acid) (Mwt 208,000) in the solution. A homogeneous mixture is formed. The solution is poured into a small glass dish at room temperature and the chloroform evaporated leaving a film. Ultraviolet light is used to cure the surfactants by either a low-output (1 to 10 mW/cm$^2$) ultra-violet lamp (Blakray) for 3 hours, or by a high-output (1 to 20 W/cm$^2$) ultraviolet light spot cure apparatus (Novacure 2100, EXFO) for 1 to 5 minutes. Polarized light microscopy shows the formation of small liquid crystal domains dispersed in the poly(lactic acid) indicative of the presence of pores. The liquid crystal domains (Inverted hexagonal phase) are colorful while the poly(lactic acid) is black when viewed by polarized light and a polarizing filter at 90 degrees to the incident light. A small amount of chloroform may be retained in the poly(lactic acid) as a plasticizer. The composite exhibits liquid crystal domains ranging in size from less than 1 micron up to 20 microns, which contain pores formed by the inverted hexagonal phase.

Those of ordinary skill in the art will appreciate that materials, methods, techniques and procedures other than those specifically exemplified and described herein are known in the art and can be readily employed in the practice of this invention. All art-known equivalents of materials, methods, techniques and procedures described herein are intended to be encompassed by the invention. All references cited herein are incorporated by reference in their entirety herein. Reference cited herein provide additional descriptions of polymerizable LLC monomers, non-polymerizable LLC molecules, LLC phases and LLC assemblies, methods of synthesis of LLC molecules, polymerization methods and applications of composite materials.

REFERENCES

Barton, J. Free-radical polymerization in inverse microemulsions. *Prog Poly. Sci* 1996, 21, 399–438.

Capek, I. Radical polymerization of polar unsaturated monomers in direct microemulsion systems. *Adv. Colloid Interface Sci.* 1999, 80,85–149.

Clark, C. G. and K. L. Wooley, Polymerization of organized polymer assemblies, *Current Opinion in Colloid & Interface Science* 1999 4:122–129.

Collins, P. J. In *Nature's Delicate State of Matter*, Princeton University Press: Princeton, N. J., 1990.

Gin, D. L.; Gu, W.; Pindzola, B.; Zhou, W. Polymerized lyotropic liquid crystal assemblies for materials applications *Acc. Chem. Res.* 2001, 34, 973–980.

Gin, D. L.; Ray, J. H.; Smith, R. C. Polymerizable liquid crystals as building blocks for functional, nanostructured materials. *Syn Lett.* 1999, 10, 1509–1522.

Jung, M. A. L. German, H. R. Fischer, Polymerization in Lyotropic liquid-crystalline phases of dioctadecyldimethylammonium bromide, Colloid Polym. Sci. 279:105–113(2001).

Karas, D. R. ed. Design and selection of performance surfactants, vol. 2 1999, Sheffield Academic Press, CRC Press. Boca Raton, Fla.

Lee, Y. S., J-K. Yang, T. M. Sisson, D. A. Frankel, J. T. Gleeson, E. Aksay, S. L. Keller, S. M. Gruner, and D. F. O'Brien, Polymerization of non-lamellar assemblies *J. Am. Chem. Soc.* 1995, 177, 5573–5578.

Mannock, D., *Chemistry and Physics of Lipids* 111 (2001) 139–161.

McGrath, K. M. (1996), "Polymerisation of liquid crystalline phases in binary surfactant/water systems. Part 2. ω-undecenyltrimethylammonium bromide," *Colloid Polym. Sci.* 274:399–409.

Miller, S. A.; Ding, J. H.; Gin, D. L. Nanostructured materials based on polymerizable amphiphiles. *Curr. Opin. Colloid Interfaces Sci.* 1999, 4, 338–347.

O'Brien, D. F., b. Armitage, A. Benedicto, D. E. Bennett, H. G. Lamarski, Y-S. Lee, W. Srisiri, T. M. Sisson Polymerization of Preformed Self-Organized Assemblies, *Acc. Chem. Res.* 31:861–868 (1998).

Paleos, C. M. Polymerization of micelle-forming monomers. In *Polymerizations in Organized Media*, Paleos, C. M. Ed.; Gordon and Breach: Philadelphia, 1992; pp 183–214.

Pindzola B, Hoag B, Gin D "Polymerization of a Phosphonium Diene Amphiphile in the Regular Hexagonal Phase with Retention of Microstructure" JACS, 2001, 123 (19) 4617–4618.

Pindzola, B. and Doug Gin "Polymerization of phosphonium-diene based Gemini surfactants in the regular hexagonal and bi-continuous cubic phases" *Abstracts of Papers of the American Chemical Society*, 22$^{nd}$ National Meeting Aug. 26–30, 2001 Chicago, Ill.

Resel, R., G. Leising, P. Markart, M. Kreichbaum, R. Smith and D. Gin, Structural properties of polymerized lyotropic liquid crystals phases of 3,4,5-tris(ω-acryloxyalkoxy)benzoate salts, *Macromol. Chem. Phys.*, 201, 1128–1133 (2000)

Ringsdorf, H.: Schlarb, B.; Venzmer, J. Molecular architecture and function of polymeric oriented systems. *Angew. Chem., Int. Ed. Engl.* 1998, 27, 113–158.

Schnur, J. M et al. Lipid-based tubule microstructures. *Thin Solid Films* 1987, 152, 181–206

Shibasaki, Y. and Fukuda, K. (1992), "Aggregation states and polymerizabilities of amphiphillic monomer molecules in aqueous systems with different water contents," *Colloids Surf* 67:195–201.

Smith, R. C. et al. (1997), "Ordered poly-(p-phenylenevinylene) matrix nanocomposites via lyotropic liquid-crystalline monomers," *J. Am. Chem. Soc.* 119:4092–4093.

Srisiri, W. et al. (1997), "Polymerization of the inverted hexagonal phase," *J. Am. Chem. Soc.* 119:4866–48731.

Thundathil, R. et al. (1980), "Polymerization in lyotropic crystals. I. Change of structure during polymerization," *J. Polym. Sci. Polym. Chem. Ed.* 18:2629–2640.

Tiddy, G. J. T. Surfactant-water liquid crystal phases. *Phys. Rep.* 1980, 57, 1–46.

Wagner-Jauregg, T.; Hackley, B. E.; Lies, T. A.; Owen, O. O.; Proper, R. J. *J. Am. Chem. Soc.* 1955, 77, 922.

I claim:

1. A composite material which comprises:
    a polymerized lyotropic liquid crystal assembly having hydrophobic and hydrophilic regions formed by polymerization of a non-polymerized liquid crystal assembly which contains polymerizable lyotropic liquid crystal monomers, and
    a hydrophobic polymer in the hydrophobic regions of the lyotropic liquid crystal assembly wherein the hydrophobic polymer is not formed by polymerizing the lyotropic liquid crystal monomers.

2. The composite material of claim 1 wherein the hydrophobic regions of the composite comprise a lyotropic liquid crystal phase swollen with the hydrophobic polymer.

3. The composite material of claim 1 wherein the hydrophobic regions of the composite comprise subregions containing lyotropic liquid crystal phases or lyotropic liquid crystal aggregates and separated subregions of hydrophobic polymer.

4. The composite material of claim 3 wherein at least a portion of the lyotropic liquid crystal phase is swollen with the hydrophobic polymer.

5. The composite material of claim 1 wherein the lyotropic liquid crystal assembly comprises an inverted hexagonal phase.

6. The composite material of claim 1 wherein the lyotropic liquid crystal assembly is an inverted hexagonal phase.

7. The composite material of claim 1 where the polymerizable lyotropic liquid crystal assembly comprises a bi-continuous cubic phase.

8. The composite material of claim 1 where the polymerizable lyotropic liquid crystal assembly is a bi-continuous cubic phase.

9. The composite material of claim 1 wherein the hydrophobic polymer has a molecular weight equal to or greater than 500 Daltons or is comprised of at least 10 monomer repeat units.

10. The composite material of claim 1 where the hydrophobic polymer has a molecular weight equal to or greater than 1000 Daltons or is comprised of at least 20 monomer repeat units.

11. The composite material of claim 1 where the hydrophobic polymer is a linear molecule.

12. The composite material of claim 1 where the hydrophobic polymer is an elastomer.

13. The composite material of claim 1 where the hydrophobic polymer is a synthetic rubber.

14. The composite material of claim 1 where the hydrophobic polymer is butyl rubber.

15. The composite material of claim 1 where the hydrophobic polymer is selected from the group consisting of butyl rubber, poly(propyleneoxide), poly(vinylchloride), poly(propylene), poly(ethylene), chlorinated poly(ethylene), poly(acrylates), poly(methacrylates), poly(lactic acid), poly (ethyleneterphthalates), poly(styrenes) poly(aramides) and combinations thereof.

16. The composite material of claim 1 where the hydrophobic polymer comprises a mixture of at least two different polymers.

17. The composite material of claim 1 which comprises pores.

18. The composite material of claim 1 which comprises nanopores.

19. The composite material of claim 1 which contains water or a polar solvent.

20. The composite material of claim 1 wherein a polymerizable lyotrophic liquid crystal monomer has the formula:

$$(HY)_z[T(X^1)_y(X^2(P)_p)_x]_w$$

and salts thereof, where:

HY is a hydrophilic head group;

z is an integer representing the number of hydrophilic head groups;

$X^2(P)_p$ is a hydrophobic tail group which contain at least one polymerizable group P; $X^2$ and P on the same lyotrophic liquid crystal monomer may be the same or different;

x is an integer equal to or greater than 1 representing the number of hydrophobic groups carrying polymerizable groups $X^1$ is a hydrophobic tail group which does not contain a polymerizable group;

y is zero or an integer equal to or greater than 1 representing the number of hydrophobic groups in the molecule that do not carry a polymerizable group;

P is a polymerizable group;

p is an integer equal to or greater than 1 representing the number of polymerizable groups on a hydrophobic tail, T is a single bond or a linker group that provides for attachment of one or more hydrophobic tail groups to one or more hydrophilic head groups; and w is an integer equal to or less than z representing the number of T bonds or groups attached to the z HY groups.

21. The composite material of claim 20 wherein all HY are charged groups.

22. The composite material of claim 20 wherein the HY groups together form one or more zwitterionic groups.

23. The composite material of claim 20 wherein HY groups are selected from the groups consisting of carboxylate, poly(ethyleneoxide), sulfonate, sulfonate ester, sulfonium, phosphonate, phosphonate ester, phosphonium, and ammonium groups.

24. The composite material of claim 20 wherein z is 1.

25. The composite material of claim 24 wherein w is 1.

26. The composite material of claim 20 wherein w is equal to z.

27. The composite material of claim 20 wherein P groups are selected from the group consisting of acrylate, methacrylate, diene, vinyl, halovinyl, styrenes, vinylether, hydroxy groups, epoxy or other oxiranes, halooxirane, dienoyls, diacetylenes, styrenes, terminal olefins, isocyanides, acrylamides, and cinamoyl groups.

28. The composite material of claim 20 wherein P groups are dienes, olefins, acrylate or methacrylate groups.

29. The composite material of claim 20 wherein p is 1.

30. The composite material of claim 20 wherein $X^2$ are alkyl or alkenyl chains having from 7 to 24 carbon atoms.

31. The composite material of claim 20 wherein the lyotrophic liquid crystal monomer comprises more than one hydrophobic tail and at least one of the hydrophobic tails contains a polymerizable group and at least one of the hydrophobic tails does not contain a polymerizable group.

32. The composite material of claim 20 wherein T is an aryl group functionalized for attachment of $X^1$ and $X^2(P)_p$ groups.

33. The composite material of claim 20 wherein the polymerizable lyotropic liquid crystal monomers are salts of metal cations.

34. The composite material of claim 20 wherein the polymerizable lyotropic liquid crystal monomers are salts of alkali metals or alkaline earth metals.

35. The composite material of claim 33 wherein the metal cation is selected from copper(I), copper(II), cadmium(II), europium(III), cobalt(II), cobalt(III), silver (I), nickel (I), nickel(II), platinum(II), platinum (IV), gold(I), gold(III), manganese (II), manganese (III), iron (II), iron (III), zinc (II), chromium(II), chromium(III), vanadium(I), and titanium (II) cations.

36. The composite material of claim 1 wherein the polymerizable lyotropic liquid crystal monomers have the structure:

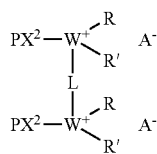

where W is nitrogen or phosphorous, $A^-$ is a suitable anion, P is a polymerizable group, $X^2$ is a hydrophobic tail, R and R' are hydrogens, or alkyl groups and L is linking group containing a linear or branched chain having from 1 to about 10 carbon atoms, which may be interrupted with one or more heteroatoms or with one or more unsaturated groups.

37. The composite material of claim 36 wherein $PX^2$—is P—$(CH_2)_m$—, where m is an integer ranging from 7 to 24.

38. The composite material of claim 36 wherein $PX^2$—is $C_{m1}H_{2(m1)+1}P(CH_2)_{m2}$—, where m1+m2=m, and m is an integer from 7 to 24.

39. The composite material of claim 36 wherein P is a diene, acrylate, methacrylate or styrene.

40. The composite material of claim 1 wherein the polymerizable LLC monomer has the structure:

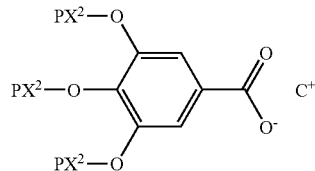

where $C^+$ is a suitable cation, P is a polymerizable group, and $X^2$ is a hydrophobic tail.

41. The composite material of claim 40 wherein P is a diene, acrylate, methacrylate or styrene.

42. The composite material of claim 40 having the structure:

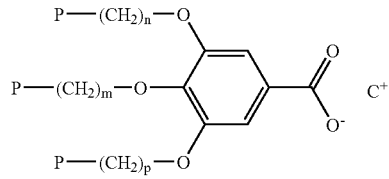

where n, m and p are integers, independently ranging in value from 7 to 24.

43. The composite material of claim 42 wherein P is an acrylate group.

44. The composite material of claim 1 wherein the lyotropic liquid crystal monomer has the structure:

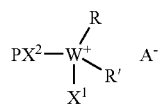

where W is nitrogen or phosphorous, $A^-$ is a suitable anion; P is a polymerizable group, $X^2$ is a hydrophobic tail, $X^1$ is a hydrophobic tail, and R and R' are hydrogens or alkyl groups.

45. The composite material of claim 44 wherein $P-X^2$ is $P-(CH_2)_m$—, where m is an integer ranging from 7 to 24, and $X^1$ is $CH_3$—$(CH_2)_n$—, where n is an integer ranging from 7 to 24.

46. The composite material of claim 44 wherein R and R' are alkyl groups.

47. The composite material of claim 44 wherein $PX^2$ is a $C_{m1}H_{2(m1)+1}P(CH_2)_{m2}$—, where m1+m2 =m, and m is an integer ranging from 7 to 24.

48. The composite material of claim 44 wherein P is a diene.

49. The composite material of claim 1 wherein the polymerizable lyotropic liquid crystal monomer has the structure:

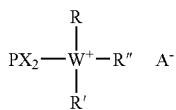

where W is nitrogen or phosphorous, A⁻ is a suitable anion, P is a polymerizable group, $X^2$ is a hydrophobic tail group, and R, R' and R", independently, are selected from hydrogens or alkyl groups.

50. The composite material of claim 49 wherein $P\text{-}X^2$ is $P\text{-}(CH_2)_m\text{—}$, where m is an integer ranging from 7 to 24, or a $C_{m1}H_{2(m1)+1}P(CH_2)_{m2}\text{—}$ group, where m1+m2 =m, and m is an integer ranging from 7 to 24.

51. The composite material of claim 49 wherein R, R' and R" are alkyl groups.

52. The composite material of claim 49 wherein P is a diene.

53. The composite material of claim 1 wherein the polymerizable lyotropic liquid crystal monomer has the structure:

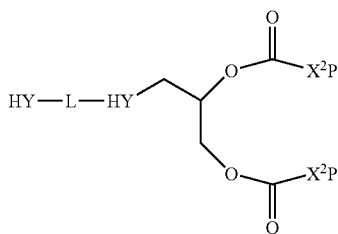

where HY are hydrophilic head groups, L is a linker group, P are polymerizable groups, and $X^2$ are hydrophobic tail groups.

54. The composite structure of claim 53 wherein P is a diene, acrylate, methacrylate, styrene or vinyl group.

55. The composite material of claim 53 wherein HY-L-HY is $N^+(R)(R')(R'')\text{-}(CH_2)_p\text{—}P^-(O_3)\text{—}O\text{—}$ where R, R', R" are, independently, hydrogens or alkyl groups, and p is an integer ranging from 2 to 8.

56. The composite material of claim 1 wherein the polymerizable lyotropic liquid crystal monomer has the structure:

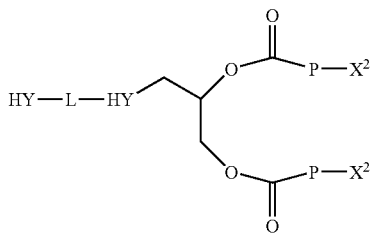

where HY are hydrophilic head groups L is a linker group, P are polymerizable groups, and $X^2$ are hydrophobic tail groups.

57. The composite material of claim 56 wherein P are dienes.

58. The composite material of claim 56 wherein $X^2$ are straight-chain alkyl or branched chain alkyl groups having from 7 to 24 carbon atoms.

59. The composite material of claim 56 wherein HY-L-HY is $N^+(R)(R')(R'')\text{—}(CH_2)_p\text{-}P^-(O_3)\text{—}O\text{—}$ where R, R', R" are, independently, hydrogens or alkyl groups, and p is an integer ranging from 2 to 8.

60. The composite material of claim 1 wherein the polymerized lyotropic liquid crystal assembly, the hydrophobic polymer, or both are crosslinked.

61. The composite material of claim 1 wherein the polymerized lyotropic liquid crystal assembly further comprises lyotropic liquid crystals which do not carry polymerizable groups.

62. The composite material of claim 1, wherein the hydrophilic regions of the polymerized liquid crystal assembly further comprise a second polymeric material which is different from the hydrophilic polymer and the polymerized liquid crystal assembly.

63. The composite material of claim 1 which comprises pores, wherein the pores comprise a second polymeric material which is different from the hydrophilic polymer and the polymerized lyotrophic liquid crystal assembly.

64. The composite material of claim 63 wherein the pores are nanopores.

65. The composite material of claim 1 wherein the polymerizable lyotropic liquid crystal monomer is sodium 3,4, 5-tris(ω- acryloyloxyundecyloxy)benzoate.

66. The composite material of claim 65 wherein the hydrophobic polymer is butyl rubber.

67. The composite material of claim 66 wherein the butyl rubber is vulcanized.

68. A composite material of claim 1 further comprising a second polymeric material which is different from the hydrophobic polymer and the polymerized lyotrophic liquid crystal assembly which is introduced into hydrophilic regions of the composite.

69. The composite material of claim 68 wherein the second polymeric material is introduced into pores of the composite.

70. The composite of claim 68 wherein the second polymeric material is selected from the group consisting of poly(acrylic acid), poly(acrylamide), poly(vinyl alcohol), poly(hydroxyethyl methacrylate), poly(N-vinyl pyrrolidinone), poly(thiophene), poly(ethylene glycol), poly(ethylenedioxythiophene), poly(p-xylylenetetrahydrothiophene chloride), poly(p-xylylene dimethylsulfonium chloride), poly(p-xylylenetetrahydrothiofuranyl chloride), poly(p-phenylenevinylene), and copolymers thereof.

71. The composite of claim 68 wherein the second polymeric material is an inorganic polymer.

72. A lyotropic liquid crystal assembly having hydrophobic and hydrophilic regions which comprises one or more polymerizable lyotropic liquid crystal monomers, which on polymerization form a lyotropic liquid crystal assembly, and one or more hydrophobic polymers, which are not formed by polymerizing the lyotrophic liquid crystal monomers, in the hydrophobic regions of the assembly.

73. The lyotropic liquid crystal assembly of claim 72 further comprising one or more non-polymerizable lyotropic liquid crystals in the assembly.

74. The lyotropic liquid crystal assembly of claim 72 further comprising water or a polar solvent.

75. The lyotropic liquid crystal assembly of claim 72 comprising a lyotropic liquid crystal phase.

76. The lyotropic liquid crystal assembly of claim 75 wherein the lyotropic liquid crystal phase is an inverted hexagonal phase.

77. The lyotropic liquid crystal assembly of claim 75 wherein the lyotropic liquid crystal phase is a bi-continuous cubic phase.

78. The assembly of claim 72 further comprising photo-initiator molecules which can induce chemical reactions upon exposure to light.

79. The assembly of claim 72 further comprising molecules that can induce crosslinking reactions.

80. A porous membrane comprising the composite material of claim 1.

81. The membrane of claim 80 comprising a thin film of the composite material on a microporous membrane support.

82. The membrane of claim 81 wherein the microporous membrane support is a polyethersulfone microporous membrane support.

83. A porous membrane prepared from the composite material of claim 1.

84. A nanoporous membrane comprising the composite of claim 1.

85. A nanoporous membrane prepared from the composite of claim 1.

86. A nanoporous membrane of claim 85 wherein the hydrophobic polymer is butyl rubber.

87. A nanoporous membrane of claim 86 wherein the polymerizable lyotropic liquid crystal assembly forms an inverted hexagonal phase.

88. The nanoporous membrane of claim 87 wherein the polymerizable lyotropic liquid crystal monomer is sodium 3,4,5-tris(ω- acryloyloxyundecyloxy)benzoate.

89. A method for making a composite of polymerizable lyotropic liquid crystals and a hydrophobic polymer which comprises the steps:
(a) combining a polymerizable lyotrophic liquid crystal monomer with a hydrophobic polymer and optionally an aqueous or polar solvent, the lyotrophic liquid crystal monomer present in an amount relative to the hydrophobic polymer and the aqueous or polar solvent present in an amount such that at least a portion of the lyotrophic liquid crystal monomer forms a lyotrophic liquid crystal phase, lyotrophic liquid crystal aggregates or both; and
(b) polymerizing the polymerizable lyotrophic liquid crystal monomer in the combination of step (a) to form a polymerized lyotrophic liquid crystal assembly thereby making the composite material.

90. The method of claim 89 where the hydrophobic polymer is subsequently crosslinked.

91. The method of claim 89 wherein in step (a) the polymerizable lyotropic liquid crystal monomer, a hydrophobic polymer and a solvent that will dissolve the hydrophobic polymer are combined and further comprising the steps after step (a) and before step (b) of
heating the combination of step (a) to a temperature above the clearing point of the polymerizable lyotropic liquid crystal monomer, cooling the combination and removing solvent from the combination to form a lyotropic liquid crystal assembly.

92. The method of claim 91 wherein the hydrophobic polymer is subsequently crosslinked.

93. The method of claim 89 further comprising the step of introducing a second polymeric material into pores formed in the composite material after polymerization of the lyotropic liquid crystal monomer.

94. The method of claim 91 further comprising the step of introducing a second polymeric material into pores formed in the composite material after polymerization of the lyotropic liquid crystal monomer.

95. The method of claim 89 wherein the composite material is a complex composite which comprises the steps:
(a) combining one or more polymerizable lyotrophic liquid crystal monomers, one or more hydrophobic polymers, one or more hydrophilic monomers and optionally an aqueous or polar solvent, the lyotrophic liquid crystal monomer present in an amount relative to the hydrophobic polymer and the aqueous or polar solvent present in an amount such that at least a portion of the lyotrophic liquid crystal monomer forms an lyotrophic liquid crystal assembly, the hydrophobic polymer within hydrophobic regions of the lyotrophic liquid crystal assembly and the hydrophilic monomers within hydrophilic regions of the lyotrophic liquid crystal assembly,
(b) polymerizing the polymerizable lyotrophic liquid crystal monomer in the combination of step (a) to form a polymerized lyotrophic liquid crystal assembly, and
(c) polymerizing the hydrophilic monomers in the combination of step(a) to form a second polymeric material within hydrophilic regions of the lyotrophic liquid crystal assembly
to thereby form a complex composite material.

96. The method of claim 95 further comprising the steps of crosslinking the hydrophobic polymer, the polymerized lyotrophic liquid crystal assembly, the second polymer or any combination thereof.

97. The composite material of claim 36 wherein $X^2$ is a straight-chain or branched alkyl group.

98. The composite material of claim 36 wherein L is an —$(CH_2)_m$— group, where m is an integer from 1 to about 10, or a —$(CH_2)_p$—O—$(CH_2)_q$— group, where p and q are 1 or 2.

99. The composite material of claim 98 wherein W is phosphorous.

100. The composite material of claim 99 wherein P is a diene.

101. The composite material of claim 100 wherein $X^2$ is an —$(CH_2)_m$— group where m is an integer ranging from 7 to 24.

102. The composite material of claim 101 where m is 10.

103. The composite material of claim 102 wherein R and R' are alkyl groups.

104. The composite material of claim 98 wherein L is a —$(CH_2)_6$— group.

105. The composite material of claim 36 wherein the hydrophobic polymer is an elastomer.

106. The composite material of claim 105 wherein the hydrophobic polymer is butyl rubber.

107. A nanoporous membrane comprising the composite material of claim 36.

108. The membrane of claim 81 wherein the microporous membrane support is a polyethylene microporous membrane support.

109. The composite material of claim 20 wherein z and w are 1, y is 0, and x is 1.

110. The composite material of claim 20 wherein the polymerizable lyotropic liquid crystal monomers are salts of Li(I), Na(I), K(I) or Sr(II).

* * * * *

UNITED STATES PATENT AND TRADEMARK OFFICE
CERTIFICATE OF CORRECTION

| | | |
|---|---|---|
| PATENT NO. | : 7,090,788 B2 | Page 1 of 1 |
| APPLICATION NO. | : 10/422604 | |
| DATED | : August 15, 2006 | |
| INVENTOR(S) | : Brian Elliott | |

It is certified that error appears in the above-identified patent and that said Letters Patent is hereby corrected as shown below:

1. Column 30, claim 20, line 40, replace "lyotrophic" with --lyotropic--
2. Column 30, claim 20, line 52, replace "lyotrophic" with --lyotropic--
3. Column 31, claim 31, line 29, replace "lyotrophic" with --lyotropic--
4. Column 33, claim 49, in the formula at line 4, replace "PX2 (subscript)" with --PX2 (superscript)--
5. Column 34, claim 63, line 21, replace "lyotrophic" with --lyotropic--
6. Column 34, claim 68, line 33, replace "lyotrophic" with --lyotropic--
7. Column 35, claim 89, line 33, replace "lyotrophic" with --lyotropic--
8. Column 35, claim 89, line 35, replace "lyotrophic" with --lyotropic--
9. Column 35, claim 89, line 39, replace "lyotrophic" with --lyotropic--
10. Column 35, claim 89, line 39, replace "lyotrophic" with --lyotropic--
11. Column 35, claim 89, line 40, replace "lyotrophic" with --lyotropic--
12. Column 35, claim 89, line 42, replace "lyotrophic" with --lyotropic--
13. Column 35, claim 89, line 44, replace "lyotrophic" with --lyotropic--
14. Column 36, claim 95, line 5, replace "lyotrophic" with --lyotropic--
15. Column 36, claim 95, line 8, replace "lyotrophic" with --lyotropic--
16. Column 36, claim 95, line 12, replace "lyotrophic" with --lyotropic--
17. Column 36, claim 95, line 13, replace "lyotrophic" with --lyotropic--
18. Column 36, claim 95, line 14, replace "lyotrophic" with --lyotropic--
19. Column 36, claim 95, line 16, replace "lyotrophic" with --lyotropic--
20. Column 36, claim 95, line 18, replace "lyotrophic" with --lyotropic--
21. Column 36, claim 95, line 20, replace "lyotrophic" with --lyotropic--
22. Column 36, claim 95, line 23, replace "lyotrophic" with --lyotropic--
23. Column 36, claim 96, line 28, replace "lyotrophic" with --lyotropic--

Signed and Sealed this

Twenty-seventh Day of March, 2007

JON W. DUDAS
*Director of the United States Patent and Trademark Office*